United States Patent
Madajczak et al.

(10) Patent No.: US 10,881,956 B2
(45) Date of Patent: Jan. 5, 2021

(54) 3D RENDERER TO VIDEO ENCODER PIPELINE FOR IMPROVED VISUAL QUALITY AND LOW LATENCY

(71) Applicant: Intel Corporation, Santa Clara, CA (US)

(72) Inventors: Tomasz Madajczak, Gdansk (PL); Jason Tanner, Folsom, CA (US); Jill Boyce, Portland, OR (US); Changliang Wang, Bellevue, WA (US); Maciej Oleksy, Gdansk (PL); James Varga, Jr., Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 19 days.

(21) Appl. No.: 16/235,702

(22) Filed: Dec. 28, 2018

(65) Prior Publication Data

US 2019/0141339 A1    May 9, 2019

(51) Int. Cl.
| | | |
|---|---|---|
| *A63F 13/53* | (2014.01) | |
| *H04N 19/154* | (2014.01) | |
| *H04N 19/159* | (2014.01) | |
| *H04N 19/176* | (2014.01) | |
| *G06T 15/00* | (2011.01) | |
| *G06T 15/50* | (2011.01) | |
| *H04N 19/51* | (2014.01) | |
| *H04N 19/103* | (2014.01) | |

(Continued)

(52) U.S. Cl.
CPC ............... *A63F 13/53* (2014.09); *G06T 9/00* (2013.01); *G06T 15/005* (2013.01); *G06T 15/503* (2013.01); *H04N 19/103* (2014.11); *H04N 19/154* (2014.11); *H04N 19/159* (2014.11); *H04N 19/172* (2014.11); *H04N 19/176* (2014.11); *H04N 19/21* (2014.11); *H04N 19/23* (2014.11); *H04N 19/29* (2014.11); *H04N 19/51* (2014.11); *H04N 19/513* (2014.11); *H04N 19/597* (2014.11)

(58) Field of Classification Search
CPC ........ H04N 19/23; H04N 19/27; H04N 19/29; H04N 19/21; H04N 19/17; H04N 19/174; H04N 19/57; H04N 19/11; H04N 19/119; H04N 13/293; H04N 13/183; H04N 13/161; H04N 13/271; H04N 13/361
See application file for complete search history.

(56) References Cited

U.S. PATENT DOCUMENTS

| | | | | |
|---|---|---|---|---|
| 6,804,302 B1 * | 10/2004 | Yamada | ................. | H04N 19/40 375/240.16 |
| 9,936,208 B1 * | 4/2018 | Brailovskiy | ........... | H04N 19/42 |

(Continued)

OTHER PUBLICATIONS

M.K. Kang, J. Lee, J.Y. Lee, & Y.S. Ho, "Geometry-based Block Partitioning for Efficient Intra Prediction in Depth Video Coding", 7543 Proc. SPIE 0A1-11 (2010) (Year: 2010).*

*Primary Examiner* — David N Werner
(74) *Attorney, Agent, or Firm* — Green, Howard & Mughal LLP.

(57) ABSTRACT

Techniques related to the render and encode of graphics frames representative of 3D video games are discussed. Such techniques include translating one or more of a transparency map, a depth map, a color compression map, or a motion field used to encode a graphics frame to encode parameters and encoding the first graphics frame using the encode parameters to generate a bitstream.

17 Claims, 14 Drawing Sheets

(51) Int. Cl.
*H04N 19/23* (2014.01)
*H04N 19/597* (2014.01)
*G06T 9/00* (2006.01)
*H04N 19/21* (2014.01)
*H04N 19/29* (2014.01)
*H04N 19/172* (2014.01)
*H04N 19/513* (2014.01)

(56) References Cited

U.S. PATENT DOCUMENTS

| | | | | |
|---|---|---|---|---|
| 10,321,158 | B2* | 6/2019 | Park | H04N 19/597 |
| 2002/0126755 | A1* | 9/2002 | Li | H04N 19/119 |
| | | | | 375/240.12 |
| 2008/0211686 | A1* | 9/2008 | Arai | G06F 3/0481 |
| | | | | 340/815.4 |
| 2010/0074321 | A1* | 3/2010 | Beaudreau | H04N 19/115 |
| | | | | 375/240.01 |
| 2012/0128238 | A1* | 5/2012 | Kameyama | G06T 3/4053 |
| | | | | 382/159 |
| 2013/0162773 | A1* | 6/2013 | Tian | H04N 19/597 |
| | | | | 348/43 |
| 2014/0009574 | A1* | 1/2014 | Hannuksela | H04N 19/597 |
| | | | | 348/42 |
| 2015/0208090 | A1* | 7/2015 | Sakakibara | H04N 19/105 |
| | | | | 375/240.12 |
| 2015/0237324 | A1* | 8/2015 | Zhang | H04N 19/119 |
| | | | | 375/240.24 |
| 2015/0264367 | A1* | 9/2015 | Chong | H04N 19/23 |
| | | | | 375/240.08 |
| 2015/0334398 | A1* | 11/2015 | Socek | H04N 19/186 |
| | | | | 375/240.26 |
| 2016/0037178 | A1* | 2/2016 | Lee | H04N 19/30 |
| | | | | 375/240.12 |
| 2016/0112707 | A1* | 4/2016 | Diefenbaugh | H04N 19/34 |
| | | | | 375/240.08 |
| 2016/0212423 | A1* | 7/2016 | Aharon | H04N 19/117 |
| 2016/0291827 | A1* | 10/2016 | Ionita | A63F 13/2145 |
| 2017/0025098 | A1* | 1/2017 | Keramidas | G09G 5/026 |
| 2017/0026662 | A1* | 1/2017 | Lee | H04N 19/513 |
| 2017/0142443 | A1* | 5/2017 | Lee | H04N 19/597 |
| 2018/0161683 | A1* | 6/2018 | Thomas | H04L 51/04 |

* cited by examiner

3D RENDERER TO VIDEO ENCODER PIPELINE FOR IMPROVED VISUAL QUALITY AND LOW LATENCY

BACKGROUND

In the context of real-time and online remotely streamed 3D video games, game content is generated and encoded at a remote server and transmitted to a user device for decode and display. For example, the game content may be rendered to video frames, which may be encoded using an encoder that generates a standards compliant bitstream. The standard may be any suitable standard format such as Advanced Video Coding (MPEG-4 AVC or H.264), High Efficiency Video Coding (HEVC or H.265), etc. Due to bit rate constraints, the encoder reduces quality (e.g., blurs) important gaming objects (e.g., player characters or text) of the rendered frames thereby making the game less playable by the user.

It may be advantageous to increase the compression efficiency, video quality, and computational efficiency of codec systems for processing video content rendered by a 3D game engine (renderer). It is with respect to these and other considerations that the present improvements have been needed.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
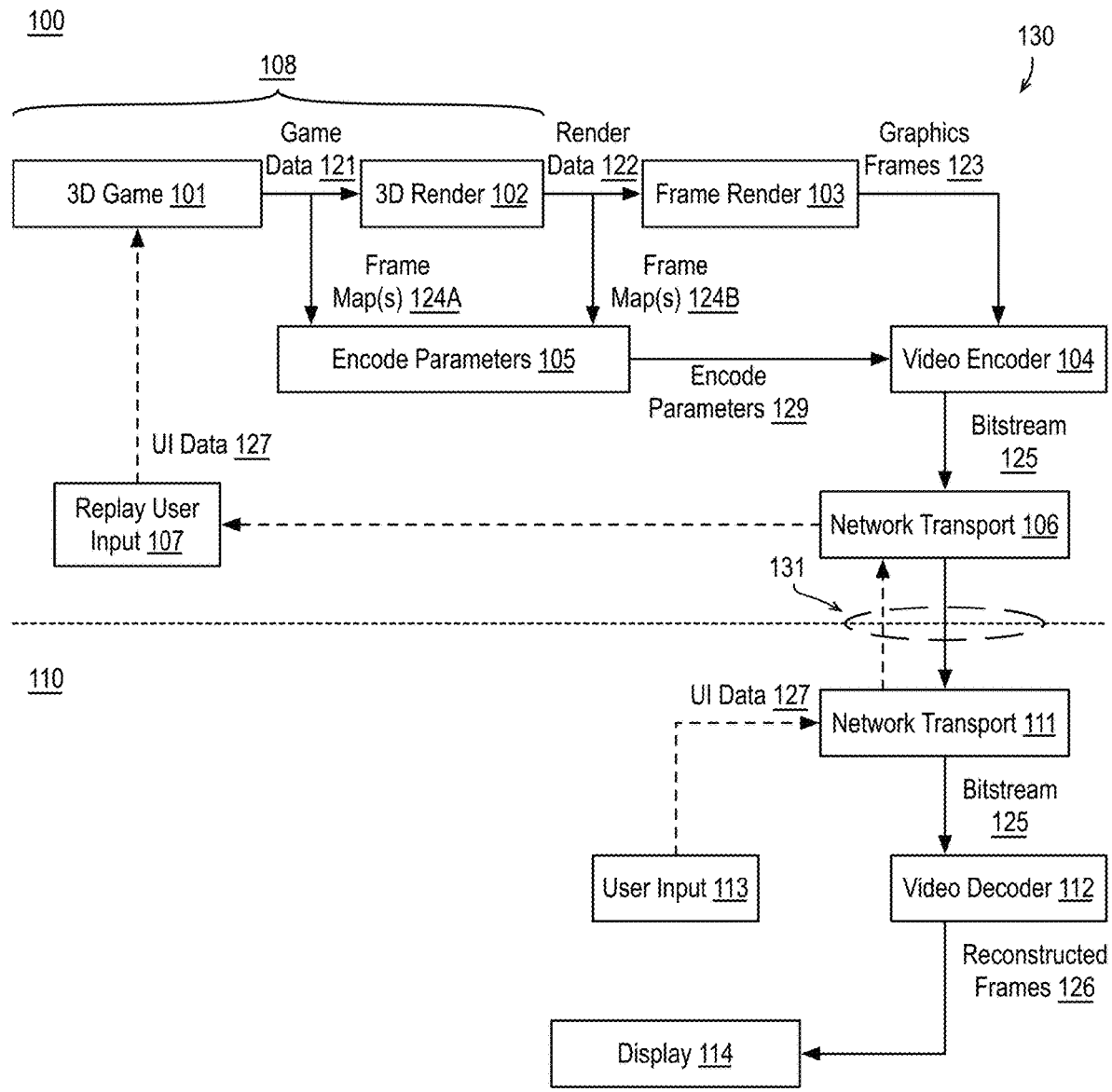
FIG. 1 is an illustrative diagram of an example context for transmitting and receiving encoded gaming content.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein. The terms "substantially," "close," "approximately," "near," and "about," generally refer to being within +/−10% of a target value. The term "satisfies" when used in reference to a threshold indicates the value in question meets the condition established by the threshold. The terms "compares favorably" when used in reference to a threshold indicates the value in question is greater than or greater than or equal to the threshold. Similarly, the terms "compares unfavorably" when used in reference to a threshold indicates the value in question is less than or less than or equal to the threshold.

Methods, devices, apparatuses, computing platforms, and articles are described herein related to a 3D renderer to video encode pipeline for improved visual quality and low latency and, in particular, to translating information generated during graphics frame rendering to one or more encode parameters for encoding the rendered graphics frames.

As discussed, in real-time online remotely streamed 3D video games, game content is generated and encoded at a remote server and transmitted to a user device for decode and display. Using the techniques discussed herein, information generated during the render of the graphics frame rendering such as a transparency map to blend two image layers into the graphics frame (e.g., an alpha buffer), a depth map of the graphics frame (e.g., a depth buffer), a color compression map of the graphics frame (e.g., a color compression buffer), or a motion field of the graphics frame is translated to one or more encode parameters for encoding the rendered graphics frames. As used herein, the term encode parameter indicates data outside of the graphics frames to be encoded that is used to encode the graphics frames. The encode parameters may include encode parameter maps or masks (e.g., providing one or more encoder parameters for each block of a frame). For example, an encode parameter map or mask may include a quantization parameter map, a quality map (e.g., indicating relative quality to be applied to each block), a motion estimation search map (e.g., indicating a motion estimation search range or list of candidate blocks for each block), a block partitioning policy map (e.g., indicating a block partitioning policy for each block), an intra mode policy map (e.g., indicating an intra mode candidates policy for each block), etc. As used herein, the term graphics frame indicates a frame generated using a render engine or the like and such frames may be contrasted with frames captured by a video camera.

FIG. 1 is an illustrative diagram of an example context 130 for transmitting and receiving encoded gaming content, arranged in accordance with at least some implementations of the present disclosure. As shown in FIG. 1, context 130 may include a system 100 and a system 110, which are communicatively coupled by a communications link 131. In an embodiment, context 130 is a 3D gaming context that includes system 100 as a host system that generates rendered graphics frames (e.g., of gaming content), which are encoded and transmitted to system 110. In such a context, system 110 may be characterized as a user system, sink, or the like and system 110 may be video game console, video game VR headset, video game computer, etc. Although illustrated with respect to a host system and user system, the techniques discussed herein may be applied in any context. Notably, either of system 100 or system 110 may be implemented in any suitable form factor device such as a server, a personal computer, a laptop computer, a tablet, a phablet, a smart phone, a gaming console, a display device, etc.

As shown, system 100 includes a 3D game module 101, a 3D render module 102, a frame render module 103, an encode parameters module 105, a video encoder 104, a replay user input module 107, and a network transport module 106. 3D game module 101 and 3D render module 102 are collectively labeled as a 3D game engine 108. 3D game module 101 receives user input data 127 and updates a game status based on user input data 127, which is transmitted as game data 121. 3D render module 102 receives game data 121 (e.g., depicting an updated game status of characters, scenes, etc. of the game) and generates render data 122 (e.g., data representing the game status as a 3D view of the game), which is then rendered into one or more rendered or graphics frames 123.

Furthermore, encode parameters module 105 receives one or more frame maps 124 (from 3D game module 101 as frame maps 124A, from 3D render module 102 as frame maps 124B, and/or from frame render module 103, not shown). Encode parameters module 105 translates frame maps 124 into encode parameters 130 using technique or techniques discussed herein. Encode parameters 129 include data outside of graphics frames 123 and provide parameters for the encode of graphics frames 123. Exemplary encode parameters 129 are discussed further with respect to FIG. 3 and elsewhere herein. As shown, in an embodiment, encode parameters 129 are provided to video encoder 104 as a separate stream with respect to graphics frames 123. In an embodiment, encode parameters 129 are provided as a channel of graphics frames 123. For example, graphics frames 123 may include R, G, B channels (or YUV) and a separate channel for encode parameters 129 in place of the alpha channel.

Video encoder 104 receives graphics frames 123 and encode parameters 129 and video encoder 104 encodes graphics frames 123 using encode parameters 129. For example, for one or more blocks of graphics frames 123, video encoder 104 uses the corresponding encode parameters 129 to encode graphics frames 123. As discussed further herein, such encode parameters 129 may indicate a block is to be coded with higher or lower quality, video encoder 104 is to skip checking on particular partitions of a block, a motion estimation search is to be limited to only a particular search range or candidate list of blocks, video encoder 104 is to skip checking one or more intra modes, etc. Notably, encode parameters 129 are generated with very low latency using frame maps 124 particular in comparison with techniques that analyze a frame, apply machine learning to a frame, etc. As shown, based on graphics frames 123 and encode parameters 129 video encoder 104 generates bitstream 125. Bitstream 125 may be of any suitable format such as a standards (e.g., AVC, HEVC, VP8, VP9, AV1, etc.) compliant format bitstream.

Bitstream 125 is transmitted, via network transport module 106, to system 110. System 110 includes a network transport module 111, a user input module 113, a video decoder 112, and a display 114. System 110, via network transport module 111, receives bitstream 125. Video decoder 112 decompresses bitstream 125 to generate reconstructed frames 126, which are displayed to a user via display 114. The user, in response to the displayed reconstructed frames 126 provides user input (e.g., via a controller, keyboard, mouse, etc.), which is translated by user input module 113 to user input data 127. User input data 127 is transmitted, via network transport module 111, to system 100. Replay user input module 107 receives user input data 127, optionally processes it (e.g., decompresses it) and provides it to 3D game module 101, where the processing repeats.

As depicted on FIG. 1, remotely streamed 3D games may operate in the model in which the application of 3D game is processed and rendered on a server high end central processing unit (CPU) and graphics processing unit (GPU) in a remote datacenter, as illustrated with respect to system 100. System 100 is coupled to local system 110 by communications link 131 (e.g., over the Internet or proprietary network). The real time online user or gamer, interacts with the game content via system 100 (e.g., a PC with a relatively lower end CPU and GPU) and watches high quality video of the game that results from the rendered and encoded 3D content. At the same time, system 110 sends back to system 100 information of the control interactions of the gamer as registered on system 110. Each of graphics frames 123 is encoded to bitstream 125 such that it is bandwidth and energy efficient for communications link 131.

Using the techniques discussed herein, an architecture is provided such that 3D game engine 108 passes information available at the rendering of graphics frames 123 to encode parameters module 105, which translates it to encode parameters 129 to aid the encoder to prioritize bits assignments to obtain better subjective quality and/or to improve computation efficiency of video encoder 104.

Figure 2:
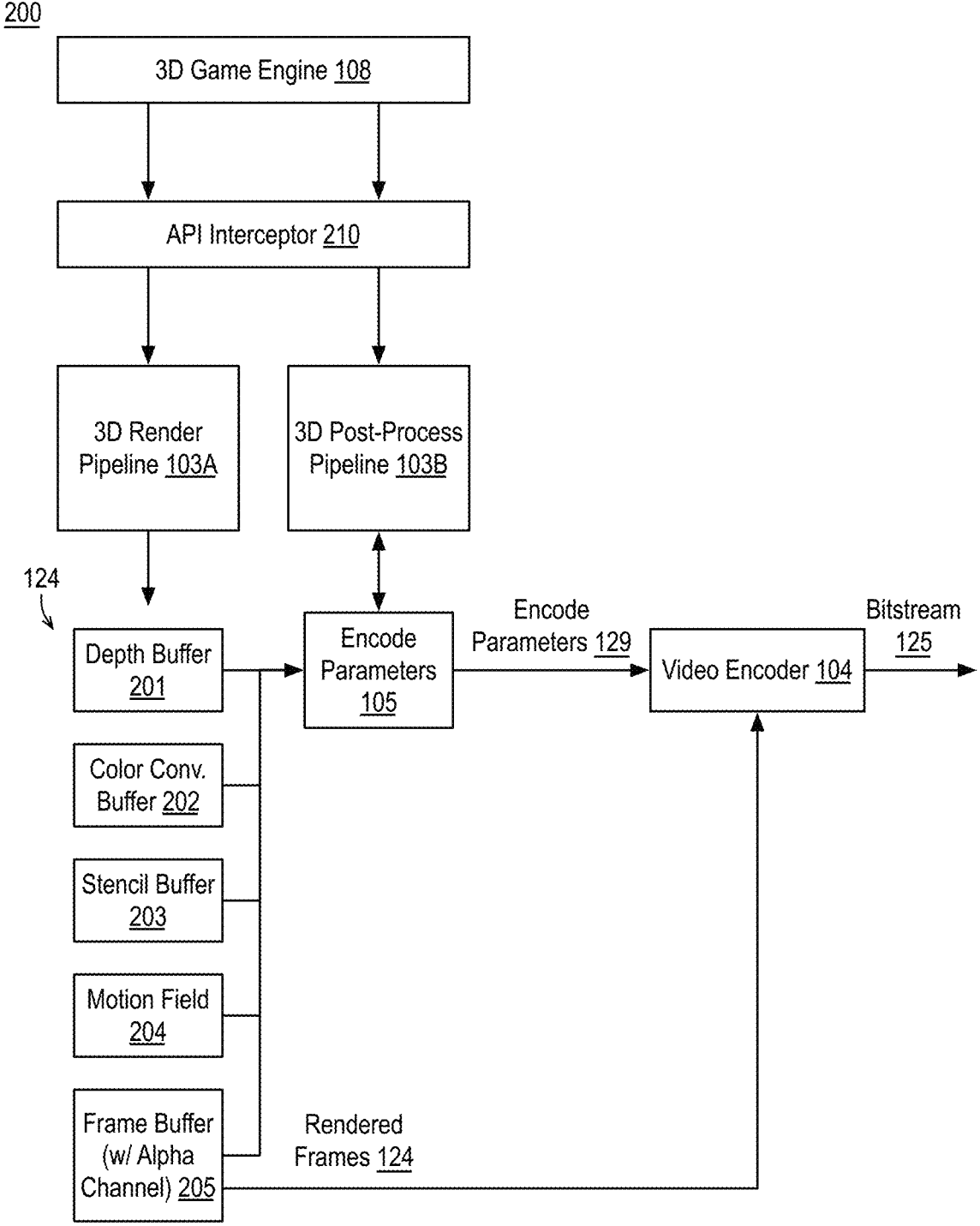
FIG. 2 is an illustrative diagram of an example pipeline architecture for encoding rendered video content.

FIG. 2 is an illustrative diagram of an example pipeline architecture 200 for encoding rendered video content, arranged in accordance with at least some implementations of the present disclosure. As shown in FIG. 2, pipeline architecture 200 includes 3D game engine 108, an application protocol interface (API) interceptor 210, a 3D render pipeline 103A, a 3D post-process pipeline 103B, encode parameters module 105 and video encoder 104. Notably, API interceptor 210 may retrieve or attain frame maps 124 from, for example, 3D game engine 108.

As shown, frame maps 124 may be stored to buffers or other memory resources. Frame maps 124 may include a depth buffer 201 storing a depth map, a color conversion buffer 202 storing a color conversion map, a stencil buffer 203 storing a stencil map, a memory resource storing a motion field 204, and a frame buffer 205 such that the frames include an alpha channel. One or more of the depth map, the color conversion map, the stencil map, the motion field, and the alpha channel, are translated by encode parameters module 105 into encode parameters 129 for use by video encoder 104. In the context of FIG. 2, a remote gaming system is capable of intercepting 3D rendering data (e.g., frame maps) through an API such as Direct3DX, OpenGL, Vulcan, or Metal or similar. For example, API calls may be issued for a graphics frame, which are detected by presenting the complete graphics frames via a virtual display application call.

Figure 3:
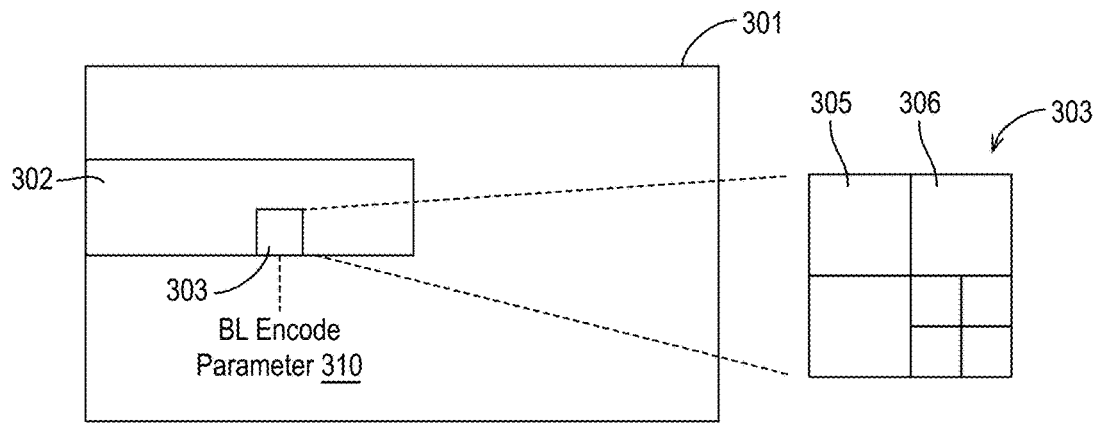
FIG. 3 illustrates exemplary encode parameters for an example graphics frame.

FIG. 3 illustrates exemplary encode parameters for an example graphics frame 301, arranged in accordance with at least some implementations of the present disclosure. Graphics frame 301 may include any frame at any resolution such as VGA, HD, Full-HD, 4K, 8K, etc. Graphics frame 301 may be any of graphics frames 123. As shown, graphics frame 301 may be segmented or partitioned into one or more slices as illustrated with respect to slice 302 of graphics frame 301. Furthermore, graphics frame 301 may be segmented or partitioned into one or more coding blocks as illustrated with respect to block 303, which may, in turn, be segmented into one or more coding sub-blocks as illustrated with respect to sub-blocks 305, 306. Herein the terms blocks and sub-blocks are used generically to indicate partitions of a frame and sub-partitions of a block. Such blocks and sub-blocks may be any size and shape. In the context of AVC, such blocks may be characterized as macroblocks. In some embodiments, block 303 is a largest coding block while sub-blocks 305 may be prediction blocks (e.g., blocks that can be coded using different inter or intra modes) and/or transform blocks (e.g., blocks that are separately transformed during coding). In the context of HEVC, such blocks may be largest coding units (LCUs) while such sub-blocks may be coding units (CUs), prediction units (PUs), or transform units (TUs).

As shown, in the context of coding graphics frame 301 using encode parameters 129, each slice or block or other region of graphics frame 301 may have an encode parameter ascribed thereto. In the example of FIG. 3, a block level (BL) encode parameter 310 may be determined for each block 303 of graphics frame 301 (although some blocks may not have an BL encode parameter. Thereby, a map or mask of BL encode parameters may be generated for use during encode. Each BL encode parameter 310 may indicate one or more of a quantization parameter for the block, a quantization parameter adjustment (e.g., QP delta) for the block, a relative quality parameter for the block (e.g., with higher values indicating higher quality priority), a motion estimation search area or candidate list for a block, a block partitioning policy for the block (e.g., to skip evaluation of certain partitions or to use a particular partition), an intra mode policy for the block (e.g., to skip evaluation of certain partitions), etc. Examples of such BL encode parameters are discussed further herein. Although discussed with respect to BL encode parameters, such encode parameters may be provided at any suitable level such as slice level. As used herein, the term BL encode parameter indicates a parameter at any block level (e.g., macroblock, LCU, CU, etc.). Notably, block 303 may be any size and shape such as, for example, 64×64 pixels, 64×16 pixels, 16×16 pixels, 16×8 pixels, 8×8 pixels, and so on.

Figure 4:
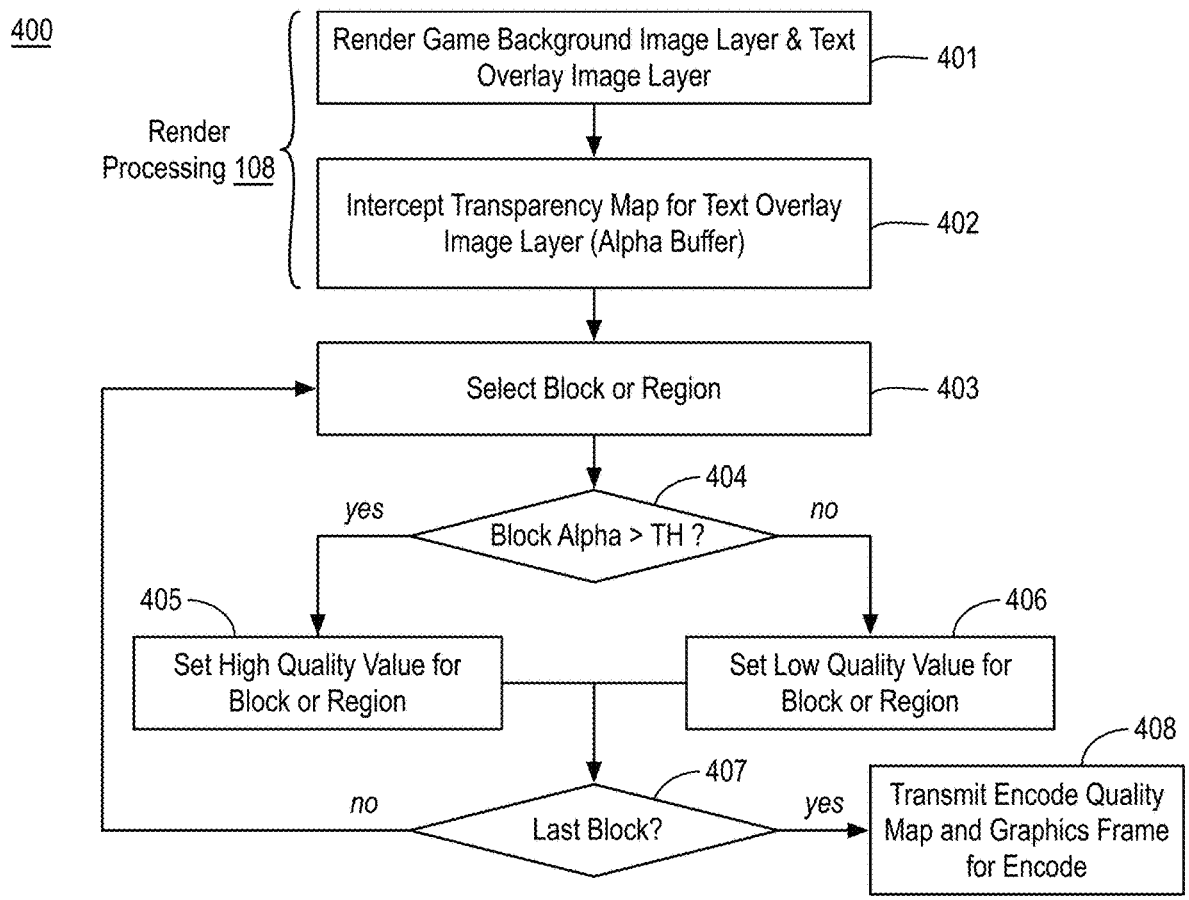
FIG. 4 is a flow diagram illustrating an example process for generating encode parameters using a transparency map from a graphics frame rendering.

FIG. 4 is a flow diagram illustrating an example process 400 for generating encode parameters using a transparency map from a graphics frame rendering, arranged in accordance with at least some implementations of the present disclosure. Process 400 may include one or more operations 401-408 as illustrated in FIG. 4. Process 400 may form at least part of a graphics frame render and encode process.

Process 400 begins at operation 401, where a background image layer and a text overlay image layer for a graphics frame are rendered, and at operation 402, where, during the render, a transparency map for the text overlay image (e.g., an alpha buffer) is intercepted. As shown, operations 401 and 402 may be executed during a render processing via game engine 108.

For example, in the context of graphics frame rendering for 3D games, a final blend operation may blend a game background image layer and a text overlay image layer based on a transparency map for the text overlay image layer (e.g., an alpha buffer). As used herein, a game background image layer indicates a game frame or image having gaming content. The game background image layer may be characterized as a game full frame, a game scene frame, etc. A text overlay image layer indicates a user interface and text frame or image for overlay onto the game background image layer. For example, the text overlay image layer may include information pertinent to a particular player (e.g., username, score, game resources) that are not pertinent to building the game background image layer. The transparency map includes blend factors (e.g., on a pixel- or block-wise basis) indicating a transparency of pixels of the text overlay image layer for the blend operation such that higher blend factors provide ever reducing transparency of the text overlay image layer. For example, for an 8 bit alpha buffer, each blend factor ranges from 0 to 255 with 255 indicating no transparency of the text overlay image layer pixel (e.g., an opaque pixel) and 0 indicating a fully transparent text overlay image layer pixel (e.g., the pixel will not be viewed at all).

Processing continues at operation 403, where a block or region of a graphics frame rendered using the game background image layer, the text overlay image layer, and the transparency map is selected. Operation 403 may select blocks or regions of the rendered graphics frame using any suitable technique or techniques such as raster scan techniques.

Processing continues at decision operation 404, where, for the block or region selected at operation 403, a blend value is determined and compared to a threshold. The blend value for the block or region may be determined using any suitable technique or techniques such as an average of pixel-wise blend values for the block or region, a median of pixel-wise blend values for the block or region, etc. As discussed, the blend values of the block indicate reducing transparency of the text overlay image layer. The blend value for the block or region is compared to a threshold, TH. The threshold may be any suitable value. In examples where the blend factor ranges from 0 to 255 as discussed above, the threshold may be about 200. In an embodiment, the threshold is in the range of 70% to 85% of a value indicating full opacity of the text overlay image layer.

If the blend value for the block or region compares favorably to the threshold, processing continues at operation 405, where a high quality value is set for the block or region. If not, processing continues at operation 406, where a low quality value is set for the block or region. In some embodiments, such high and low quality values are binary. In some embodiments, multiple threshold are provided such that higher quality values are provided for higher blend values and lower quality values are provided for lower blend values. For example, three thresholds may be used. In some embodiments, the high or low quality value for the block may be combined (e.g., summed) with one or more other quality values for the block.

Processing continues at decision operation 407, where a determination is made as to whether the last block has been processed. If not, processing continues at operation 403 as discussed above. If so, processing continues at operation 408 where the resultant encode quality map (e.g., having a quality value for each block of the rendered graphics frame) is transmitted along with the rendered graphics frame to an encoder for encode.

The resultant encode quality map may include relative encode quality parameters for use by an encoder such that blocks having higher encode quality parameters are prioritized to receive more bits during encode while blocks having lower encode quality parameters are deprioritized. In some embodiments, the resultant encode quality map is translated to a quantization parameter or quantization parameter adjustment map. In such embodiments, the resultant encode quality map may include QP values (lower indicating higher quality) for direct use by the encoder for at least some of the blocks. For example, lower quality parameter blocks may allow for the encoder to select the QP while higher quality parameter blocks may have an established (relatively low) QP for direct use by the encoder. In other examples, the resultant encode quality map may include delta QP values that are to be used by the encoder to adjust the QP values generated by the encoder using rate distortion optimization or the like. For example, the resultant encode quality map may indicate a moderate increase in QP values for blocks requiring lower quality and a decrease in QP values for blocks requiring higher quality. In yet other examples, a resultant encode quality map having proposed QP values is provided and the encoder may modify such values during encode.

Furthermore, in some embodiments, the blend value discussed at decision operation 404 may be combined with another parameter to determine the high or low quality value for the block. In an embodiment, when the blend value is above a first threshold (lower than the threshold discussed above) and a blend value variance (e.g., a measure of the spread of the blend values of the block from the average thereof) is above a second threshold, a high quality value is applied and otherwise, a low quality value is applied. Such techniques may capture those blocks having some text or similar information while not being entirely such content.

Figure 5:
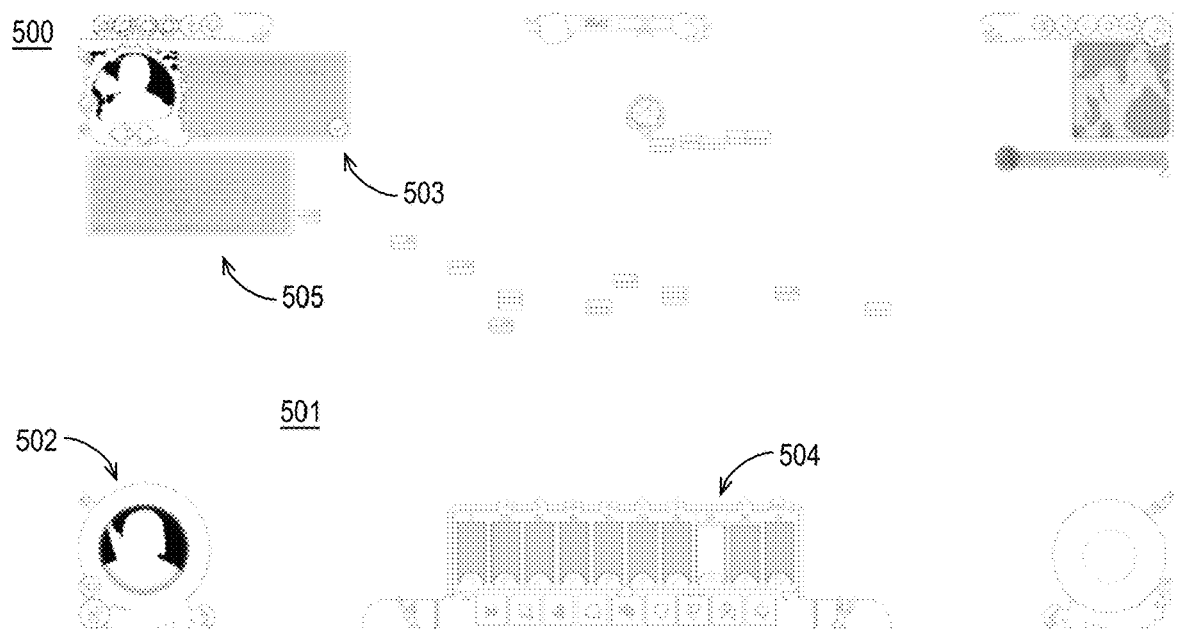
FIG. 5 illustrates an example transparency map.

FIG. 5 illustrates an example transparency map 500, arranged in accordance with at least some implementations of the present disclosure. As shown in FIG. 5, transparency map 500 includes blend values 501, 502, 503, 504, 505 such that higher blend values (e.g., darker values) indicate pixels and regions where text or similar information from a text overlay image layer will be overlaid onto a game background image layer. Notably, blend values 501 are white (e.g., 0) indicating no text (or similar information) overlay while blend values 502, 503, 504, 505 are dark grey or black indicating text (or similar information) overlay.

Figure 6:
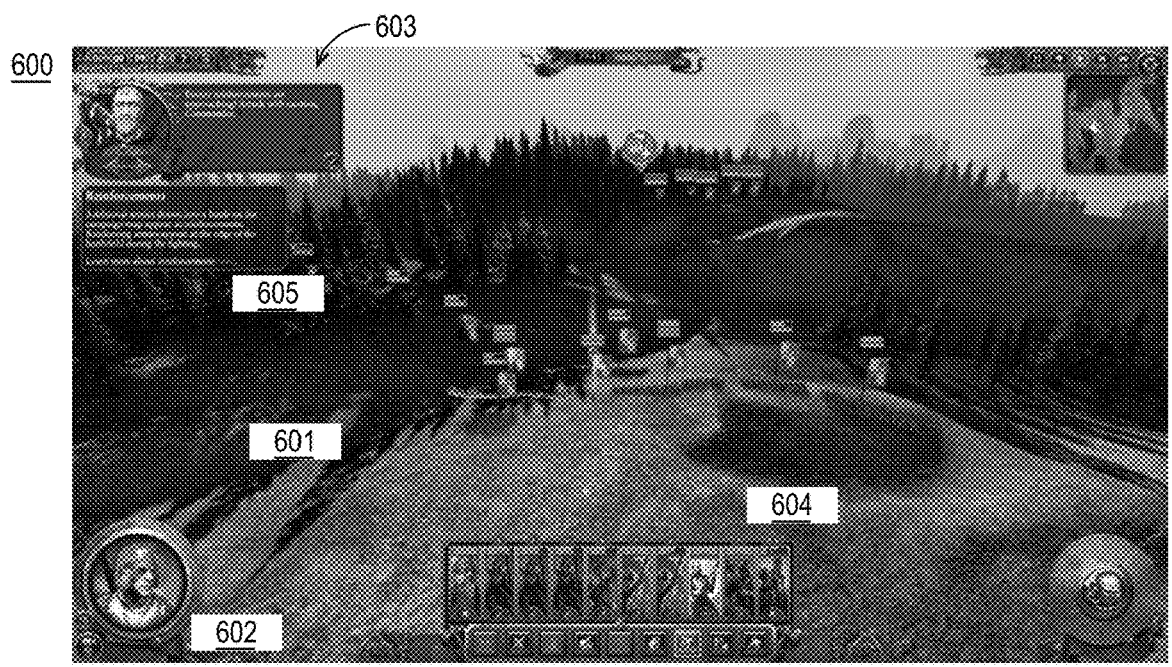
FIG. 6 illustrates an example resultant graphics frame after blending exemplary game background image text overlay image layers.

FIG. 6 illustrates an example resultant graphics frame 600 after blending exemplary game background image text overlay image layers, arranged in accordance with at least some implementations of the present disclosure. As shown in FIG. 6, resultant graphics frame 600 includes a game background image layer 601 (indicating, in this example, the bulk of resultant graphics frame 600) overlaid with regions or portions of text or similar information 602, 603, 604, 605. Notably, during encode, blocks of resultant graphics frame 600 entirely containing or largely containing text or similar information 602, 603, 604, 605 higher visual quality coding will be applied. For example, the discussed alpha buffer (or channel) indicates where text will be located so the encode quality parameter map can be used to enhance visual quality (and thereby readability) in those blocks or regions.

Figure 7:
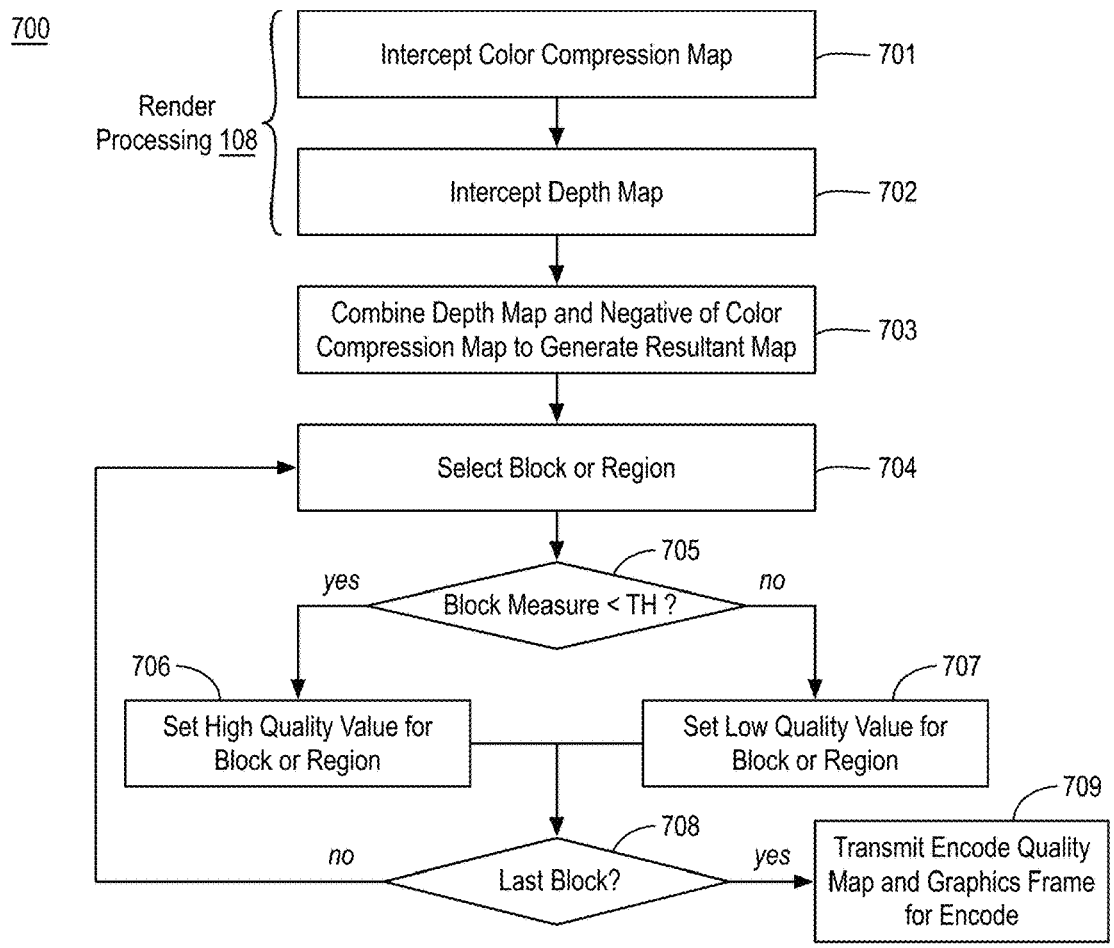
FIG. 7 is a flow diagram illustrating an example process for generating encode parameters using a color compression map and a depth map from a graphics frame rendering.

FIG. 7 is a flow diagram illustrating an example process 700 for generating encode parameters using a color compression map and a depth map from a graphics frame rendering, arranged in accordance with at least some implementations of the present disclosure. Process 700 may include one or more operations 701-709 as illustrated in FIG. 7. Process 700 may form at least part of a graphics frame render and encode process.

Process 700 begins at operation 701, where a color compression map (color compression buffer) for a graphics frame is intercepted during the render of the graphics frame, and at operation 702, where, a depth map for a graphics frame is intercepted during the render of the graphics frame. As shown, operations 701 and 702 may be executed during a render processing via game engine 108.

For example, in the context of graphics frame rendering for 3D games, a color compression map and a depth map may be used to render the graphics frame. The color compression map indicates pixel- or block-wise color compression values such that the color compression values indicate whether or not color compression is to be performed for the pixel or block of pixels and/or indicate spatial color compression with higher color compression values indicating higher spatial color compression.

Figure 8:
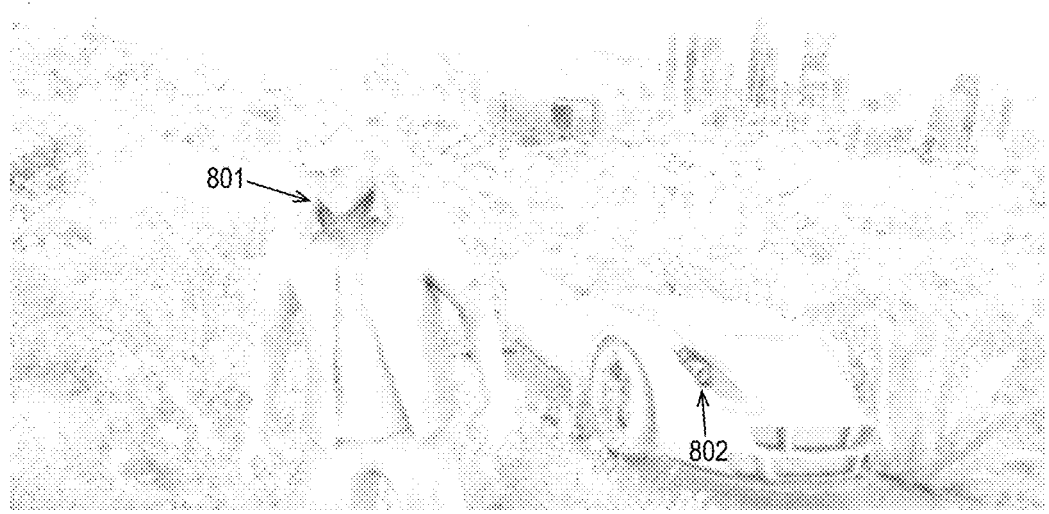
FIG. 8 illustrates an example color compression map.

FIG. 8 illustrates an example color compression map 800, arranged in accordance with at least some implementations of the present disclosure. As shown in FIG. 8, color compression map 800 includes color compression values 801, 802, 803. Such higher (white) values indicate locations (by pixel or block) where color compression will be performed and lower (dark) values indicate locations (by pixel or block) where color compression will be performed. For example, color compression map 800 may include a binary map or mask with values of one indicating color compression locations and values of zero indicating no color compression will be performed. In other embodiments, color compression map 800 may have greater values including values indicating where no color compression will be performed (e.g., zero), values indicating where small area color compression will be performed (e.g., 1), values indicating where medium area color compression will be performed (e.g., 2), and values indicating where large area color compression will be performed (e.g., 2). In some embodiments, in place of color compression map 800, a screen space ambient occlusion (SSAO) map may be used having values indicating density of pixel occlusion.

With reference to FIG. 7, as discussed with respect to operation 702, a depth map for a graphics frame is intercepted during the render of the graphics frame.

Figure 9:
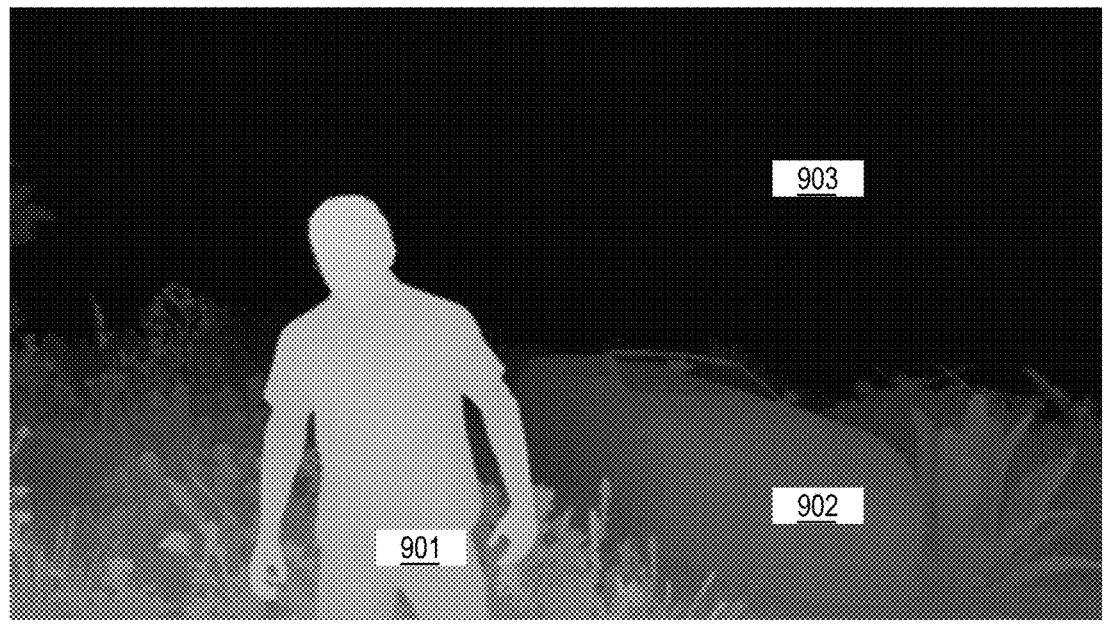
FIG. 9 illustrates an example depth map.

FIG. 9 illustrates an example depth map 900, arranged in accordance with at least some implementations of the present disclosure. As shown in FIG. 9, depth map 900 includes depth values 901, 902, 903 such higher (darker) values indicate locations (by pixel or block) further from the camera perspective of the corresponding graphics frames. For example, depth map 900 may be an 8 bit map with values ranging from 0 to 255 where a value of 0 indicates a closest available depth from the camera perspective and a value of 255 indicates a maximum depth from the camera perspective. In the illustrated depth map 900, the person illustrated by depth values 901 may be about 5 meters from the camera perspective, the car illustrated by depth values 902 may be about 10 meters from the camera perspective, the sky illustrated by depth values 903 may be at a maximum distance (e.g., +infinity) from the camera perspective, and so on.

Although discussed herein with respect to a depth map, the techniques corresponding thereto may also be performed with respect to a stencil map or stencil buffer. Such a stencil map or buffer includes a map of objects (and object separations) on a per-pixel basis using an integer value with a depth of, for example, 8 bits. For example, the stencil map or buffer may indicate, on a pixel-by-pixel basis, which object a pixel belongs to. As discussed, the techniques described using a depth map and depth values may therefore be performed using a stencil map or buffer using object values.

Returning to FIG. 7, processing continues at operation 703, where the depth map intercepted at operation 702 and a negative of the color compression map intercepted at operation 701 are combined to generate a resultant map. For example, on a pixel- or block-wise basis, the pertinent depth value from the depth map and the negative of the color compression map may be summed. In some embodiments, one or both of the depth value from the depth map and the negative of the color compression value from the color compression map may be scaled (e.g., using linear scaling factor(s)) prior to summing. For example, pixels or blocks that are close to the camera perspective and for which color compression is not to be performed have lower values than those that are farther from the camera perspective and for which color compression is to be performed using such techniques.

Figure 10:
FIG. 10 illustrates an example resultant map that is a combination of an example depth map and a negative of an example color compression map.

FIG. 10 illustrates an example resultant map 1000 that is a combination of example depth map 900 and a negative of example color compression map 800, arranged in accordance with at least some implementations of the present disclosure. As shown in FIG. 10, resultant map 1000 is a sum of depth map 900 and the negative of example color compression map 800 (with one or both optionally scaled prior to summation) such that higher (darker) values indicate locations (by pixel or block) that are a combination of being further from the camera perspective and pixels or blocks that were color compressed (and optionally with a larger color compression spatial factor) during render. In contrast, lower (lighter and white) values indicate locations (by pixel or block) that are a combination of being closer to the camera perspective and pixels or blocks that were not color compressed (and optionally with a larger color compression spatial factor) during render. For example, resultant map 1000 includes resultant values 1001, 1002, 1003 such higher (darker) values indicate locations having some combination of pixels or blocks that are further from the camera perspective and were color compressed (and/or optionally with a large spatial compression factor) and lower (lighter) values indicating locations having some combination of pixels or blocks that are closer to the camera perspective and were not color compressed (and/or optionally with a small spatial compression factor. For example, resultant map 1000 may be an 8 bit map with values ranging from 0 to 255 where a value of 0 indicates a closest available depth from the camera perspective and no color compression and a value of 255 indicates a large (or maximum depth) from the camera perspective and/or large spatial color compression in some combination. In the illustrated resultant map 1000, the high detail region of the person illustrated by resultant values 1001 may have values of not more than 5 (with low detail regions of the person having values in the range of about 6 to 20), the high detail region of the car illustrated by resultant values 1001 may have values in the range of about 6 to 20 (with low detail regions of the car having values in the range of about 21 to 100), the sky illustrated by resultant values 1001 may have values of not less than 220, and so on.

Again returning to FIG. 7, processing continues at operation 704, where a block or region of a graphics frame rendered using the color compression map and depth map is selected. Operation 704 may select blocks or regions of the rendered graphics frame using any suitable technique or techniques such as raster scan techniques.

Processing continues at decision operation 705, where, for the block or region selected at operation 403, a block measure value based on the resultant map is determined and compared to a threshold. The block measure value for the block or region may be determined using any suitable technique or techniques such as an average of pixel- or sub-block-wise resultant values for the block or region, a median of pixel- or sub-block-wise resultant values for the block or region, etc. As discussed, the resultant values of the block indicate a combination of depth and whether or not color compression was performed in the render. The block measure value for the block or region is compared to a threshold, TH. The threshold may be any suitable value. In examples where the depth value factor ranges from 0 to 255 and the color compression value is scaled by a factor of 8, the threshold may be 40.

If the block measure value for the block or region compares unfavorably to the threshold, processing continues at operation 706, where a high quality value is set for the block or region. If not, processing continues at operation 707, where a low quality value is set for the block or region. In some embodiments, such high and low quality values are binary. In some embodiments, multiple threshold are provided such that higher quality values are provided for lower block measure values and lower quality values are provided for higher block measure values. For example, three thresholds may be used. In some embodiments, the high or low quality value for the block may be combined (e.g., summed) with one or more other quality values for the block such as those discussed with respect to FIG. 4.

Processing continues at decision operation 708, where a determination is made as to whether the last block has been processed. If not, processing continues at operation 704 as discussed above. If so, processing continues at operation 709 where the resultant encode quality map (e.g., having a quality value for each block of the rendered graphics frame) is transmitted along with the rendered graphics frame to an encoder for encode.

As discussed with respect to FIG. 4, the resultant encode quality map may include relative encode quality parameters for use by an encoder such that blocks having higher encode quality parameters are prioritized to receive more bits during encode while blocks having lower encode quality parameters are deprioritized, the resultant encode quality map may be translated to a quantization parameter or quantization parameter adjustment map, etc. In an embodiment, the encode quality map generated with respect to process 400 may be summed with the encode quality map generated with respect to process 700 and the resultant summed encode quality map may be used during encode.

Figure 11:
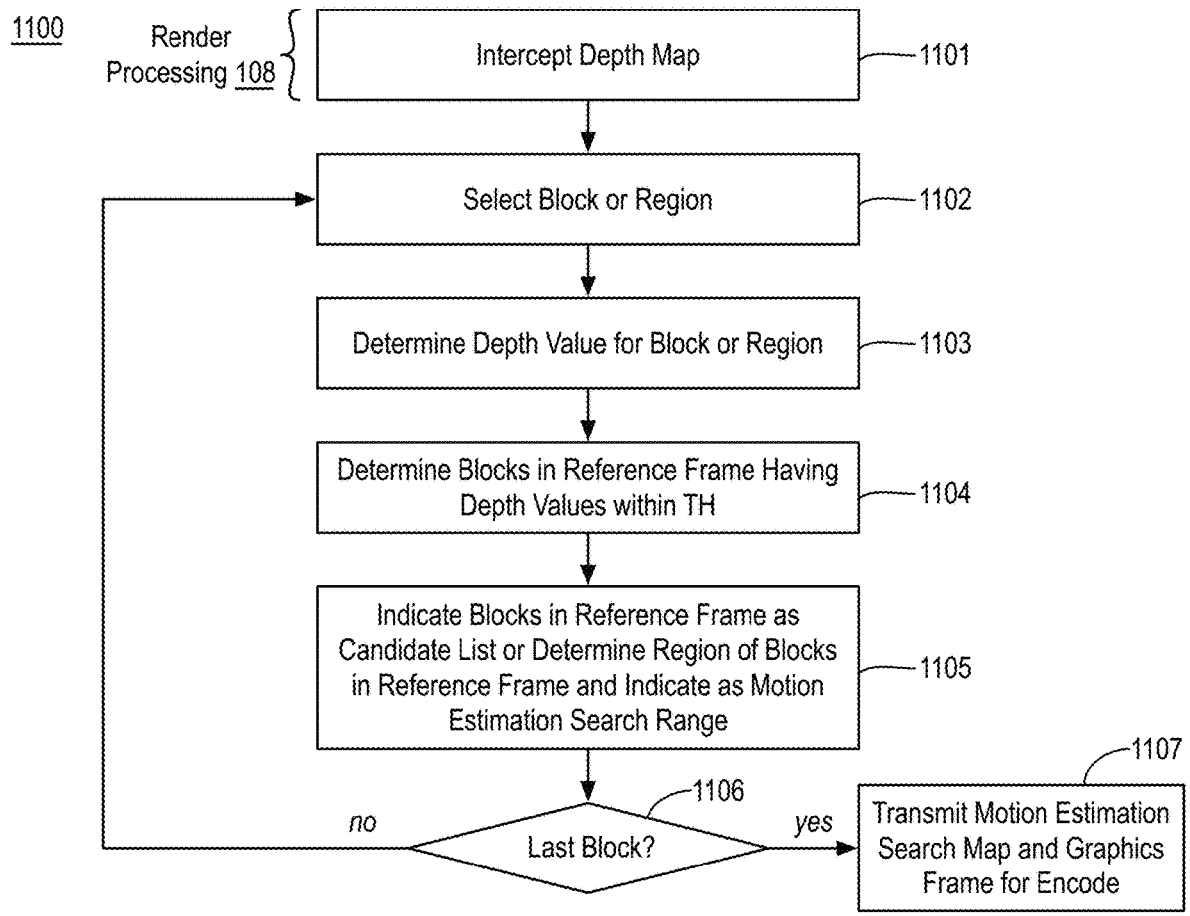
FIG. 11 is a flow diagram illustrating an example process for generating encode parameters including a motion estimation search policy using a depth map from a graphics frame rendering.

FIG. 11 is a flow diagram illustrating an example process 1100 for generating encode parameters including a motion estimation search policy using a depth map from a graphics frame rendering, arranged in accordance with at least some implementations of the present disclosure. Process 1100 may include one or more operations 1101-1107 as illustrated in FIG. 11. Process 1100 may form at least part of a graphics frame render and encode process.

Process 1100 begins at operation 1101, where a depth map for a graphics frame is intercepted during the render of the graphics frame. As shown, operation 1101 may be executed during a render processing via game engine 108. The depth map intercepted at operation 1101 may be any suitable depth map such as depth map 900. For example, in the context of graphics frame rendering for 3D games, a depth map may be used to render the graphics frame. The depth map indicates pixel- or block-wise distances from a camera perspective.

Processing continues at operation 1102, where a block or region of a graphics frame rendered using the depth map is selected. Operation 1102 may select blocks or regions of the rendered graphics frame using any suitable technique or techniques such as raster scan techniques.

Processing continues at operation 1103, where a depth value for the block or region is determined. The depth value for the block or region may be determined using any suitable technique or techniques such as an average of pixel-wise (or sub-block-wise) depth values for the block or region, a median of pixel-wise (or sub-block-wise) depth values for the block or region, etc. As discussed, the depth values of the block indicate depth from a camera perspective.

Processing continues at operation 1104, where, using the depth value for the block or region, one or more blocks (if any) of a reference frame (e.g., a frame to be used as a reference in motion estimation) are detected that have a similar depth value that is within a threshold of the depth value for the block or region generated at operation 1102. For example, a difference between the depth value for the block or region generated at operation 1102 is compared with the depth values for blocks of the reference frame and, if the difference is less than a threshold, the block of the reference frame is kept as a motion estimation candidate and, if not, the block of the reference frame is discarded for motion estimation. The threshold, TH, may be any suitable value such as 0.5 or 1 m.

Processing continues at operation 1105, where the candidate blocks in the reference frame detected at operation 1104 are indicated for the current block selected at operation 1102. The candidate blocks may be indicated using any suitable technique or techniques such as a list of candidate blocks (e.g., by location difference with respect to a collocated block of the current block), as a motion estimation search range, etc.

Figure 12:
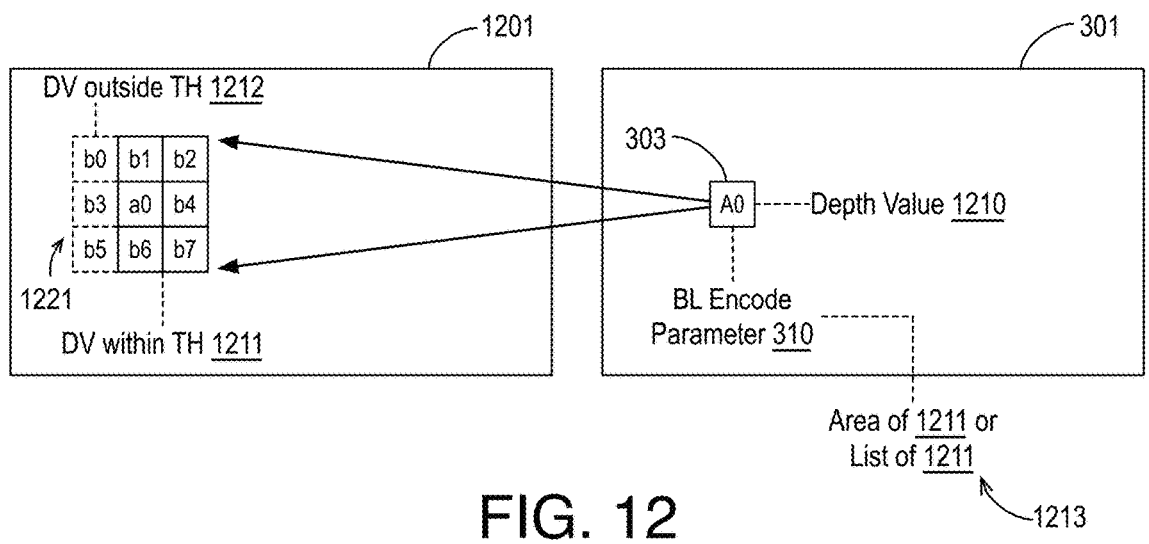
FIG. 12 illustrates exemplary motion estimation candidate blocks for an example current block of a graphics frame.

FIG. 12 illustrates exemplary motion estimation candidate blocks 1211 for an example current block 330 of a graphics frame 301, arranged in accordance with at least some implementations of the present disclosure. As discussed, for block 303, A0, a depth value 1210 is determined as discussed with respect to operation 1103. Also as shown, a reference frame 1201 relative to graphics frame 301 is accessed such that, during encode, reference frame 1201 is to be used (e.g., is available) as a reference frame in motion estimation. Although illustrated with respect to a single reference frame 1201, any number of reference frames may be used. With respect to reference frame 1201, any number of blocks 1221 may be evaluated as potential motion estimation candidates for block 303. For example, a limited area of reference frame 1201 relative to a collocated block, a0, of blocks 1221 may be evaluated. In the illustrated example, nine of blocks 1221 are evaluated (e.g., collocated block a0 and 8 neighbors, b0-b7), however, any number may be evaluated with or without overlap and optionally at sub-pixel resolution.

As discussed with respect to operation 1104, depth values for each of blocks 1221 are determined or accessed and compared with depth value 1210. If within a threshold, TH, of the depth value of block 303, the block is kept as a candidate and, if not the block is discarded. In the illustrated example, blocks 1211, including b1, b2, a0, b4, b6, b7 have a depth value (DV) within the threshold and blocks 1212 b0, b3, b5 do not. Based on the resulting blocks 1211, as shown with respect to BL encode parameter 310, a motion estimation search policy 1213 that includes a list of motion estimation candidates (e.g., indicators of b1, b2, a0, b4, b6, b7 using locations thereof relative to a0) or a motion estimation search range (e.g., indicating the region of b1, b2, a0, b4, b6, b7) is generated.

Processing continues at decision operation 1106, where a determination is made as to whether the last block has been processed. If not, processing continues at operation 1102 as discussed above. If so, processing continues at operation 1107 where the resultant motion estimation search map (e.g., having a motion estimation search range or a list of candidates for blocks of the rendered graphics frame) is transmitted along with the rendered graphics frame to an encoder for encode.

The resultant motion estimation search map includes a motion estimation search policy for use by an encoder. The encoder, for blocks having a motion estimation search range or a list of candidates, evaluates only the motion estimation search range or the list of candidates during motion estimation search and does not search any other regions of the pertinent reference frame(s). Thereby, the encoder may provide a fast, high computational efficiency, and high quality motion estimation search without the waste of searching blocks or regions that are not at the same depth as the current block.

Furthermore, in some embodiments, the depth value discussed at decision operation 1103 may be combined with another parameter in generation of the motion estimation search policy. In an embodiment, when a depth value variance (e.g., a measure of the spread of depth values of the block from the average thereof) is above a second threshold, no motion estimation search policy is provided for the block. Such techniques may provide for full motion estimation search when the block or region has high variance depth values that do not necessarily indicate a high correlation for the block.

In some embodiments, temporal tracking may be used to supplement the techniques discussed with respect to process 1100. For example, for the current graphics frame and the block selected at operation 1102, a temporal change in depth per frame may be determined for the block using a plurality of corresponding blocks in graphics frames temporally prior to the first graphics frame. The temporal change in depth for the block may be determined on a per frame basis (e.g., all blocks have the same value) or on a block-by-block basis. For per frame techniques, a depth value for each frame may be determined (e.g., as average depth value) and the average depth value per frame may be tracked. For block-by-block techniques, temporal block or object tracking techniques may be used and the change in average depth value for the block or object may be tracked. In any event, blocks of the reference frame having depth values within a threshold of the first depth value as adjusted based on the temporal change in depth per frame may be kept as candidate blocks. For example, depth value 1210 (or the depth values of blocks 1221) is adjusted using the temporal change in depth to bring the blocks to the same temporal reference point. Then, the adjusted values are compared as discussed and, if they are within a threshold of one another, the reference block is kept and, otherwise, the reference block is discarded. The passing reference blocks are then indicated in the motion estimation search map as discussed above.

Figure 13:
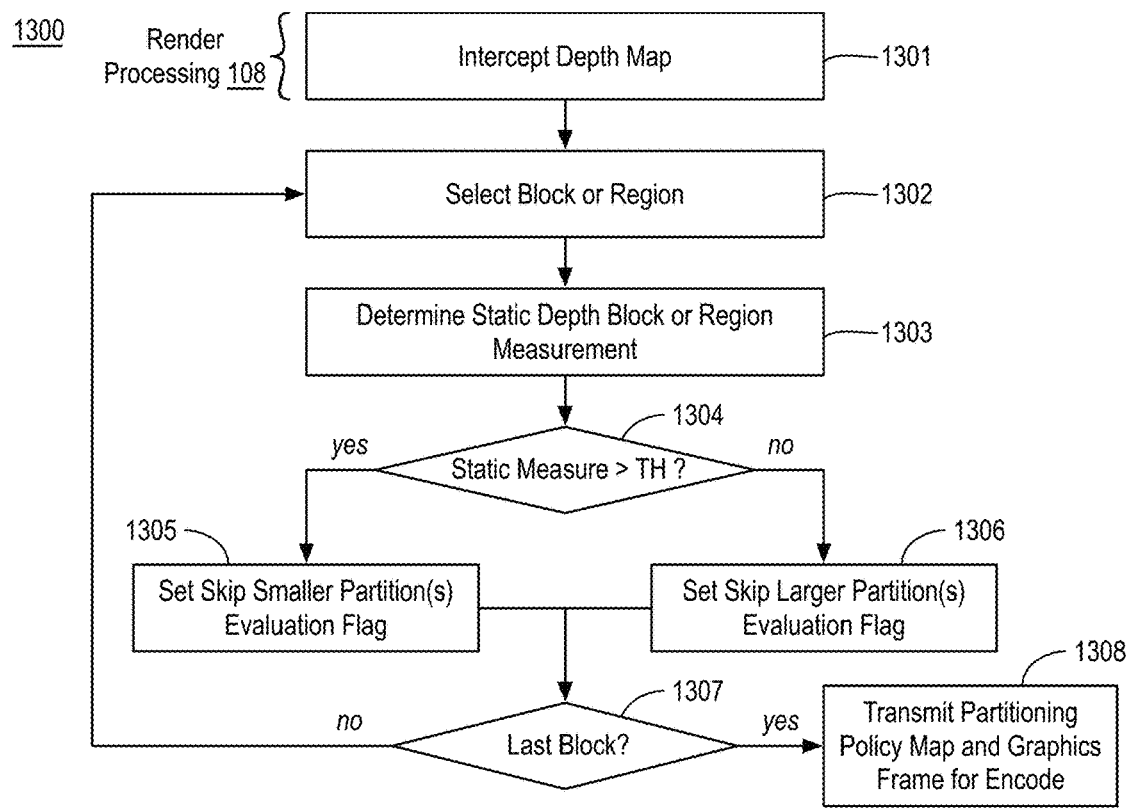
FIG. 13 is a flow diagram illustrating an example process for generating encode parameters including a block partitioning policy map using a depth map from a graphics frame rendering.

FIG. 13 is a flow diagram illustrating an example process 1300 for generating encode parameters including a block partitioning policy map using a depth map from a graphics frame rendering, arranged in accordance with at least some implementations of the present disclosure. Process 1300 may include one or more operations 1301-1308 as illustrated in FIG. 13. Process 1300 may form at least part of a graphics frame render and encode process.

Process 1300 begins at operation 1301, where a depth map for a graphics frame is intercepted during the render of the graphics frame. As shown, operation 1301 may be executed during a render processing via game engine 108. The depth map intercepted at operation 1301 may be any suitable depth map such as depth map 900. For example, in the context of graphics frame rendering for 3D games, a depth may be used to render the graphics frame. The depth map indicates pixel- or block-wise distances from a camera perspective.

Processing continues at operation 1302, where a block or region of a graphics frame rendered using the depth map is selected. Operation 1302 may select blocks or regions of the rendered graphics frame using any suitable technique or techniques such as raster scan techniques.

Processing continues at operation 1303, where, for the block or region selected at operation 1303, a static depth block measurement is determined. The static depth block for the block or region may be determined using any suitable technique or techniques such as an inverse of a variance of pixel-wise (or sub-block-wise) depth values for the block or region, as an inverse of an average absolute deviation of pixel-wise (or sub-block-wise) depth values for the block or region, etc.

Processing continues at decision operation 1304, where the static depth block measurement for the block or region is compared to a threshold, TH. If the static depth block measurement for the block or region compares favorably to the threshold, processing continues at operation 1305, where one or more indicators or flags are provided for the block or region to indicate evaluation of smaller partitions is to be skipped. If not, processing continues at operation 1306, where one or more indicators or flags are provided for the block or region to indicate evaluation of a one or more larger partitions is to be skipped. In other embodiments, only one of operations 1305 or 1306 may be performed based on the result of decision operation 1304. For example, evaluation of smaller partitions may be skipped when the block or region is static and/or evaluation of larger partitions may be skipped when the block or region is not static. Alternatively, a measure of noise for the block or region may be used and the measure may be needed to compare favorably to a threshold to access operation 1306 and or compare unfavorably to a threshold to access operation 1305. The indicators or flags to skip partition evaluation may indicated using any suitable technique or techniques.

Figure 14:
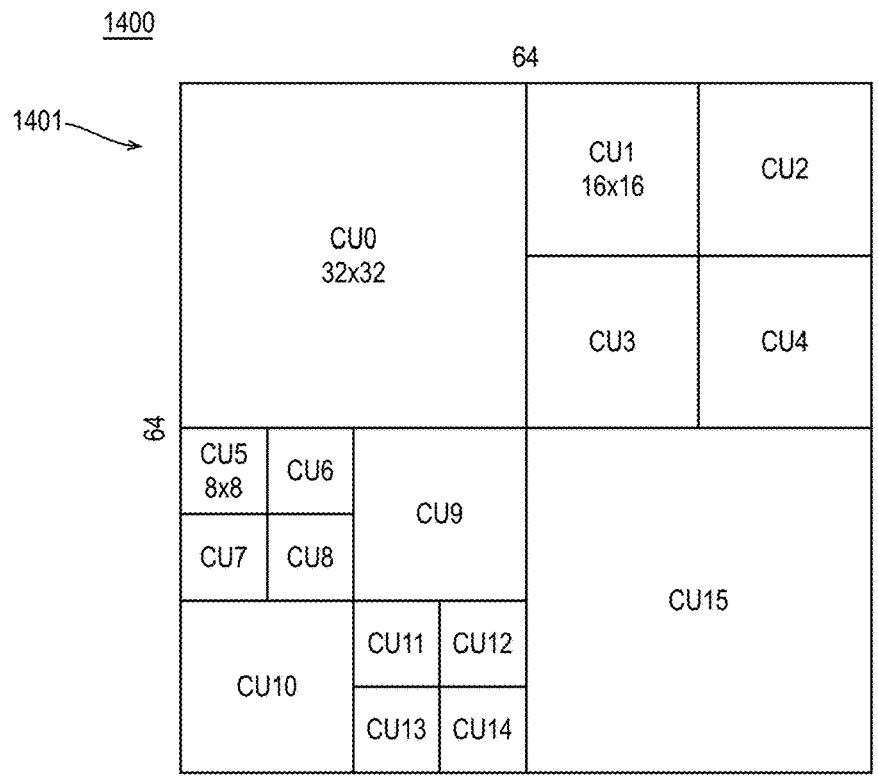
FIG. 14 illustrates an example partitioning of a block into sub-blocks.

FIG. 14 illustrates an example partitioning of a block into sub-blocks, arranged in accordance with at least some implementations of the present disclosure. In the example of FIG. 14, the coding architecture of HEVC is used for the sake of clarity of presentation. However, the techniques discussed herein may be applied to any coding architecture. As shown in FIG. 4, in the context of HEVC, a coding tree unit (or block) 1400 may be 64×64 pixels, which may define a largest coding unit (LCU). Also as shown, coding tree unit 1400 may be partitioned for coding into coding units 1401, which are labeled as CU0-CU15 and their sizes. FIG. 14 illustrates an example partitioning of a block 1400 into sub-blocks 1401 after partitioning decisions have been made. Notably, using the techniques discussed herein, certain block sizes are not evaluated based on the block partitioning policy indicated to the encoder.

For example, when block 1400 is static, evaluation of smaller partitions such as 8×8 partitions or smaller may be skipped. For example, as used herein, a partitioning level may partition a block by half in each direction with a top level being un-partitioned and a bottom level having a maximum number of partitions. In an embodiment, when smaller partitions are skipped only evaluation of the bottom level (e.g., 4×4 partitions) is skipped. In another embodiment, when smaller partitions are skipped evaluation of the bottom level and one level up from the bottom level (e.g., 4×4 and 8×8 partitions) are skipped. Similarly, in some embodiments, when larger partitions are skipped only evaluation of the top level (e.g., 64×64 partitions) is skipped. In another embodiment, when larger partitions are skipped evaluation of the top level and one level down from the top level (e.g., 64×64 and 32×32 partitions) are skipped. In such partitioning policy implementations both intra and inter mode prediction may be skipped for the skipped partitions.

Figure 15:
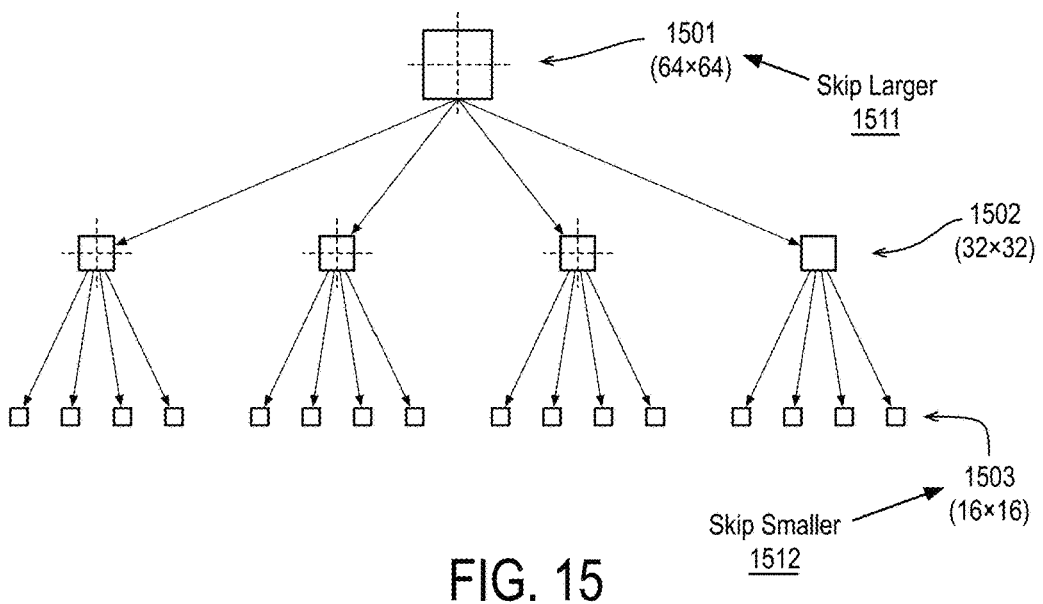
FIG. 15 illustrates an example partitioning of an example block into example candidate sub-blocks.

FIG. 15 illustrates an example partitioning of an example block 1501 into example candidate sub-blocks, arranged in accordance with at least some implementations of the present disclosure. As shown in FIG. 15, a syntax may be provided to partition blocks into candidate sub-blocks for evaluation. For example, at a top or root level 1501, a block of size 64×64 may be provided for evaluation. The coding unit at the first level may be partitioned into four quadrants and each quadrant (e.g., of size 32×32) may be provided at a second level 1502 as sub-blocks for evaluation. Each of the sub-blocks at second level 1502 may be partitioned into four quadrants and each quadrant (e.g., of size 16×16) may be provided at a third level 1503 again as sub-blocks (e.g., 16 sub-blocks) for evaluation. Such a process may be repeated for a fourth level (having 64 sub-blocks of size 8×8; not shown), and a fifth level (having 256 sub-blocks of size 4×4; not shown), and so on unit a minimum allowable coding unit size is reached. Although discussed with respect to a quadtree syntax, any suitable syntax or partitioning technique may be used.

As shown in FIG. 15, the discussed partition policy may provide an indicator 1511 (e.g., as provided at operation 1306) to skip at least top level 1501 (and optionally second level 1502). Furthermore, the partition policy may provide an indicator 1512 (e.g., as provided at operation 1305) to skip one or more bottom levels as illustrated with respect to third level 1503, although indicator 1512 may provide for skipping the first level (not shown) or the fourth and fifth levels (not shown) as discussed.

Returning to FIG. 13, processing continues at decision operation 1307, where a determination is made as to whether the last block has been processed. If not, processing continues at operation 1302 as discussed above. If so, processing continues at operation 1308 where the resultant block partitioning policy map (e.g., having a block partitioning policy for blocks of the rendered graphics frame) is transmitted along with the rendered graphics frame to an encoder for encode.

The resultant block partitioning policy map includes a block partitioning policy for use by an encoder. The encoder, for blocks having skip smaller or larger partition policy, evaluates only alternative partitions and does not evaluate (for inter or intra) any other partitions of the pertinent bloc or region. Thereby, the encoder may provide a fast, high computational efficiency, and high partition search.

Figure 16:
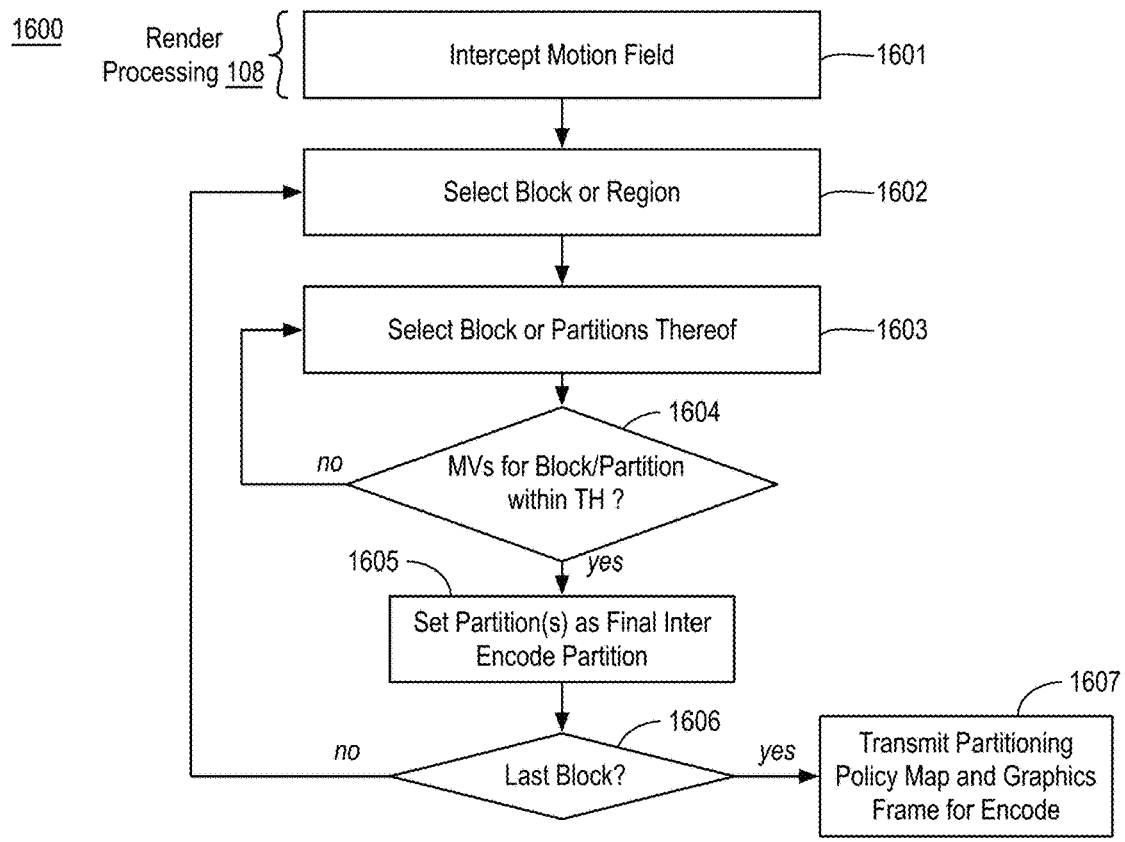
FIG. 16 is a flow diagram illustrating an example process for generating encode parameters including a block partitioning policy map using a motion field from a graphics frame rendering.

FIG. 16 is a flow diagram illustrating an example process 1600 for generating encode parameters including a block partitioning policy map using a motion field from a graphics frame rendering, arranged in accordance with at least some implementations of the present disclosure. Process 1600 may include one or more operations 1601-1607 as illustrated in FIG. 16. Process 1600 may form at least part of a graphics frame render and encode process.

Process 1600 begins at operation 1601, where a motion field for a graphics frame is intercepted during the render of the graphics frame. As shown, operation 1601 may be executed during a render processing via game engine 108. The motion field intercepted at operation 1601 may be any suitable motion field such as a pixel-by-pixel or sub-block-by-sub-block motion vector field. For example, in the context of graphics frame rendering for 3D games, a motion field may be used to render the graphics frame. The motion field indicates pixel- or block-wise motion vectors.

Processing continues at operation 1602, where a block or region of a graphics frame rendered using the motion field is selected. Operation 1602 may select blocks or regions of the rendered graphics frame using any suitable technique or techniques such as raster scan techniques.

Processing continues at operation 1603, where, for the block or region selected at operation 1603, the block or sub-blocks thereof are selected. Operation 1603 may select the block or sub-blocks thereof using any suitable technique or techniques. In an embodiment, the block itself is first evaluated and then sub-blocks using a partitioning scheme (e.g., as discussed with respect to FIG. 15) is then used to determine sub-blocks for evaluation. In another embodiment, the block itself is first evaluated and then a subsequent sub-block is selected based on an overall analysis of the block.

Processing continues at decision operation 1604, where, using the motion field, motion vectors for the block or sub-blocks are evaluated to determine whether all of the motion vectors thereof are within a threshold of one another. Such an evaluation may be made using any suitable technique or techniques. In an embodiment, the x- and y-offsets of the motion vectors must both be within a threshold of one another such as being not more than 2 pixels different in each of the x- and y-directions. In another embodiment, the x- and y-offsets of the motion vectors must all be in the same direction (e.g., plus x or minus x and plus y or minus y) and the magnitudes must all be within a threshold of one another to satisfy the condition.

If the condition of decision operation 1604 is not satisfied, processing continues at operation 1603 where one or more additional partitions are selected and evaluated or, if no other partitions are to be evaluated, at operation 1606, with no partition policy being set for the block.

If the condition of decision operation 1604 is satisfied, processing continues at operation 1605 where, for the block or sub-block a final inter encode partition policy is set for that block or sub-block. Notably, more than one sub-block can be selected for the block. In addition, a motion vector (e.g., an average motion vector for the selected block or sub-block may be indicated).

Figure 17:
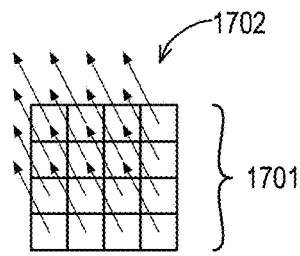
FIG. 17 illustrates exemplary motion vectors of an exemplary block or sub-block.

FIG. 17 illustrates exemplary motion vectors 1702 of an exemplary block or sub-block 1701, arranged in accordance with at least some implementations of the present disclosure. As shown in FIG. 17, for a selected block or sub-block 1701, all of pixel-wise motion vectors 1702 indicate the same or nearly the same motion such that each of motion vectors 1702 are aligned and within a threshold of one another, as discussed with respect to process 1600. For such a block or sub-block 1701, the block partitioning policy may indicate the partition or sub-block as a final decision for the partition or sub-block (e.g., no other partitions are to be checked at encode) and a particular motion vector (e.g., an average or median motion vector of motion vectors 1702) may be associated with block or sub-block 1701 such that no motion search is performed.

Returning to FIG. 16, processing continues at decision operation 1606, where a determination is made as to whether the last block has been processed. If not, processing continues at operation 1602 as discussed above. If so, processing continues at operation 1607 where the resultant block partitioning policy map (e.g., having a block partitioning policy for blocks of the rendered graphics frame) is transmitted along with the rendered graphics frame to an encoder for encode.

The resultant block partitioning policy map includes a block partitioning policy for use by an encoder. The encoder, for blocks having the block itself or a sub-block thereof indicated as discussed with respect to operation 1605 uses the selected block partition or sub-block partition without evaluating any other partitions including the block or sub-partition of the block or evaluating any other partitions of the block or sub-partition. Therefore, the block or sub-block partition is set for encode. In determining a coding mode for the block or sub-block, a motion search may be performed, the average or median motion vector of motion vectors 1702 may be used directly, or a limited search using the average or median motion vector of motion vectors 1702 may be employed (e.g., searching only with a range such as +/−2 pixels in x- and y- of the average or median motion vector of motion vectors 1702).

Figure 18:
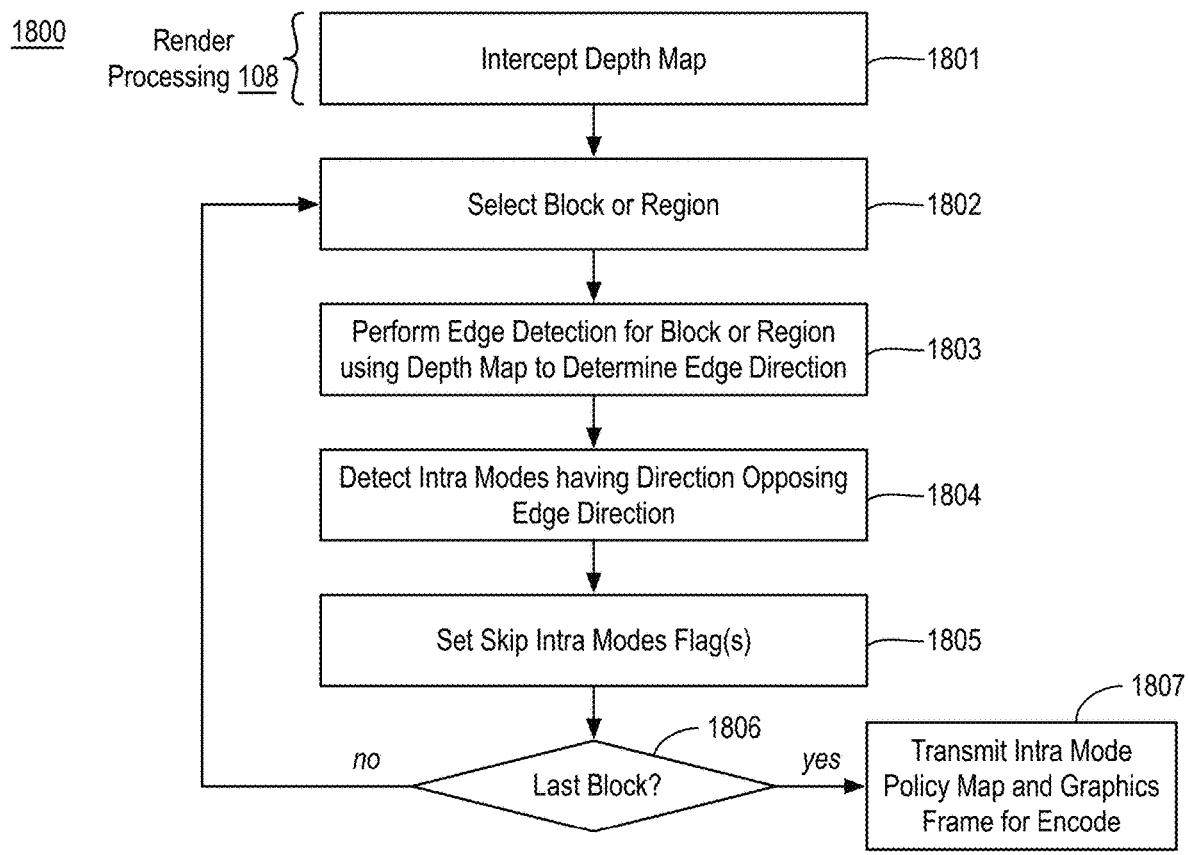
FIG. 18 is a flow diagram illustrating an example process for generating encode parameters including an intra mode policy map using a depth map from a graphics frame rendering.

FIG. 18 is a flow diagram illustrating an example process 1800 for generating encode parameters including an intra mode policy map using a depth map from a graphics frame rendering, arranged in accordance with at least some implementations of the present disclosure. Process 1800 may include one or more operations 1801-1807 as illustrated in FIG. 18. Process 1800 may form at least part of a graphics frame render and encode process.

Process 1800 begins at operation 1801, where a depth map for a graphics frame is intercepted during the render of the graphics frame. As shown, operation 1801 may be executed during a render processing via game engine 108. The depth map intercepted at operation 1801 may be any suitable depth map such as depth map 900. For example, in the context of graphics frame rendering for 3D games, a depth map may be used to render the graphics frame. The depth map indicates pixel- or block-wise distances from a camera perspective.

Processing continues at operation 1802, where a block or region of a graphics frame rendered using the depth map is selected. Operation 1802 may select blocks or regions of the rendered graphics frame using any suitable technique or techniques such as raster scan techniques.

Processing continues at operation 1803, where, for the block or region selected at operation 1803, edge detection is performed for the block or region using the depth map to determine a direction of an edge (if any) within the block or region. That is, using the block or region of the depth map collocated with the block or region selected at operation 1803, edge detection is performed in the depth map to determine any edge and, if an edge exists, the direction of the edge. The direction of the edge may be indicated using any suitable technique or techniques such as a degree of rotation offset from horizontal (or vertical) between 0° and 180°. In an embodiment, a horizontal edge is a 0° edge, a vertical edge is 90°, a top-left to bottom-right diagonal edge is 45°, a top-right to bottom-left diagonal edge is 135°, and so on.

Processing continues at operation 1804, where one or more intra modes having a direction opposing the edge direction are detected. The one or more intra modes may be those that are outside of a particular rotational band of the detected edge. For example, all intra modes outside of those directions that are not within 30° in either direction of the detected edge may be discarded.

Figure 19:
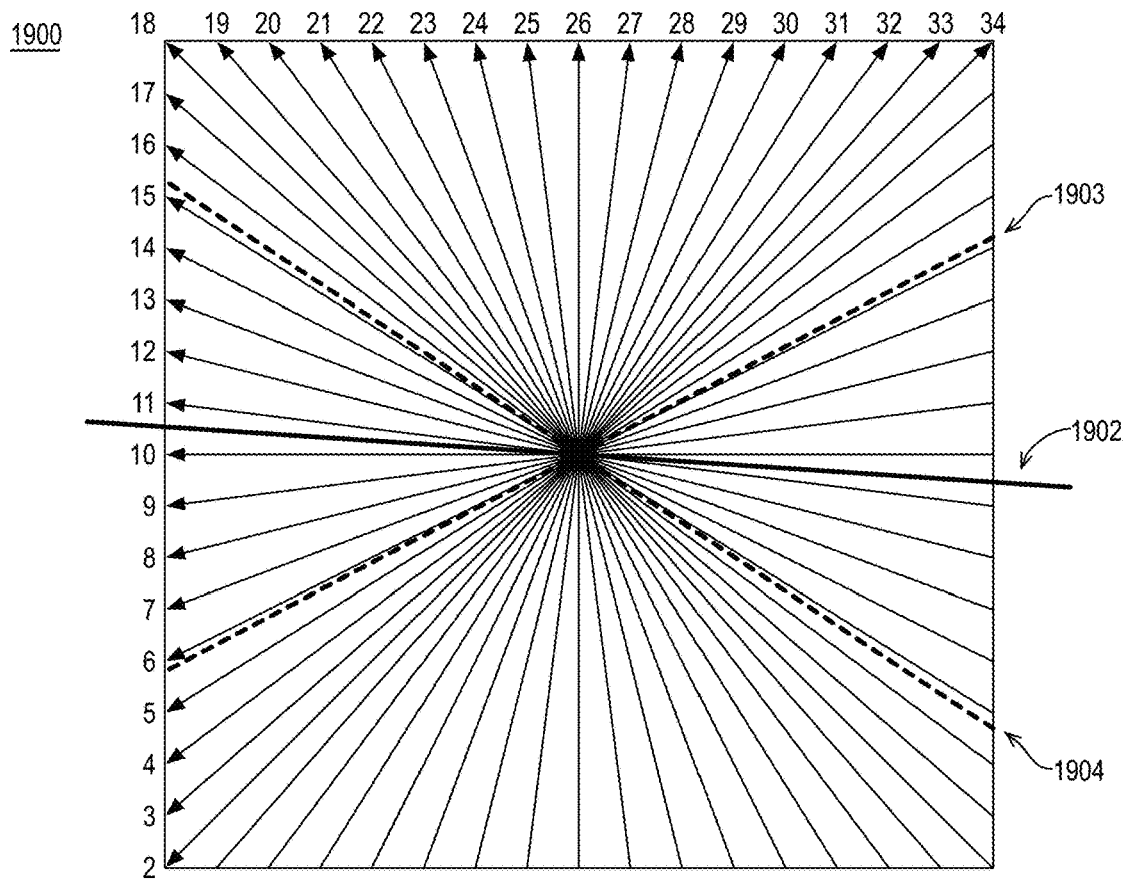
FIG. 19 illustrates exemplary intra modes and an exemplary detected edge direction.

FIG. 19 illustrates exemplary intra modes 1900 and an exemplary detected edge direction 1902, arranged in accordance with at least some implementations of the present disclosure. Intra modes 1900 are illustrated with respect to HEVC intra modes and have defined prediction characteristics as known in the art. The techniques discussed herein may be used with respect to HEVC intra modes or those of any other suitable coding standard. For example, detected edge direction 1902 may be determined at operation 1803. In the illustrated example, detected edge direction 1902 is 4° (e.g., it is a nearly horizontal edge). Using detected edge direction 1902, a band of useable intra modes are established using first intra mode boundary 1903 and second intra mode boundary 1904. First and second intra mode boundaries are established using a rotational band around detected edge direction 1902 such as 30°. Although illustrated with respect to a 30° (in either direction) band, other examples are available. In an embodiment, the band is 15° in either direction. In an embodiment, the band is 45° in either direction. Notably, a smaller band will eliminate more intra modes for the sake of faster encode but at the potential cost of lower quality.

As discussed with respect to operation 1804, intra modes having a direction opposing detected edge direction 1902 are detected. In the illustrated example, modes 2-5 and 16-34 are determined to be opposing detected edge direction 1902 as they are outside of the intra modes provided by first intra mode boundary 1903 and second intra mode boundary 1904. In other examples, the modes within first intra mode boundary 1903 and second intra mode boundary 1904 are determined. In either case, those intra modes to be evaluated at encode, and those that are not, are determined and indicated for blocks having a detected edge.

As shown in FIG. 17, for a selected block or sub-block 1701, all of pixel-wise motion vectors 1702 indicate the same or nearly the same motion such that each of motion vectors 1702 are aligned and within a threshold of one another, as discussed with respect to process 1600. For such a block or sub-block 1701, the block partitioning policy may indicate the partition or sub-block as a final decision for the partition or sub-block (e.g., no other partitions are to be checked at encode) and a particular motion vector (e.g., an average or median motion vector of motion vectors 1702) may be associated with block or sub-block 1701 such that no motion search is performed.

Returning to FIG. 18, processing continues at operation 1805, where skip intra mode flags are set for the block such that the flags indicate the intra modes having a direction opposing the edge direction. The skip intra mode flags are not to be evaluated at encode. Alternatively, intra mode flags may be set for the block that indicate the intra modes that are to be evaluated at encode.

Processing continues at decision operation 1806, where a determination is made as to whether the last block has been processed. If not, processing continues at operation 1802 as discussed above. If so, processing continues at operation 1807 where the resultant intra mode policy map (e.g., having an intra mode candidates policy blocks of the graphics frame) is transmitted along with the rendered graphics frame to an encoder for encode.

The resultant intra mode policy map includes an intra mode evaluation policy for use by an encoder. The encoder, for blocks having an intra mode evaluation policy indicated evaluates only those intra modes as indicated by the policy. The encoder, for blocks having an intra mode evaluation policy, evaluates only the pertinent intra modes and does not evaluate those opposing the edge direction. Thereby, the encoder may provide a fast, high computational efficiency, and high partition search.

Figure 20:
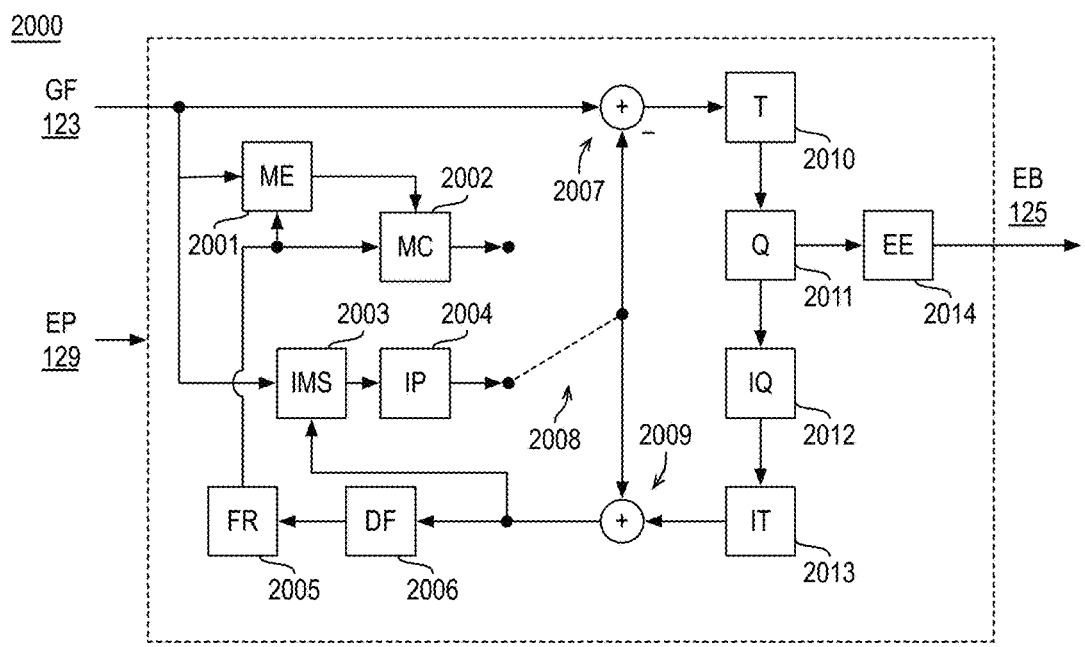
FIG. 20 illustrates a block diagram of an example encoder.

FIG. 20 illustrates a block diagram of an example encoder 2000, arranged in accordance with at least some implementations of the present disclosure. As shown, encoder 2000 may include a motion estimation (ME) module 2001, a motion compensation (MC) module 2002, an intra mode selection (IMS) module 2003, an intra prediction (IP) module 2004, a frame reconstruction (FR) module 2005, a deblock filtering (DF) module 2006, a differencer 2007, a selection switch 2008, an adder 2009, a transform (T) module 2010, a quantization (Q) module 2011, an inverse quantization (IQ) module 2012, an inverse transform (IT) module 2013, and an entropy encoder (EE) module 2014. Encoder 2000 may include additional modules and/or interconnections that are not shown for the sake of clarity of presentation.

As shown, encoder 2000 receives graphics frames (GF) 123 and encode parameters (EP) 129, and encoder 2000 generates encoded bitstream (EB) 125. As discussed herein, encoder 2000 encodes graphics frames 123 under the control of encode parameters 129 by, for example, limiting partition searching, limiting intra mode evaluation, modifying block QP or quality, etc. For example, encoder 2000 divides each frame of graphics frames 123 into blocks of different sizes, which may be predicted either temporally (inter) via motion estimation module 2001 and motion compensation module 2002 or spatially (intra) via intra mode selection module 2003 and intra prediction module 2004. Such a coding decision may be implemented via selection switch 2008. Notably, such partition searching, temporal prediction, and spatial prediction may be limited based on a motion estimation search map, a block partitioning policy map, and/or an intra mode policy map as implemented by encode parameters 129.

Furthermore, after the decision is made as to whether a block is going to be intra or inter coded, a difference with source pixels may be made via differencer 2007. The difference is converted to the frequency domain (e.g., based on a discrete cosine transform) via transform module 2010 and converted to coefficients via quantization module 2011. Notably, the quantization parameter implemented by quantization module 2011 may be based on or influenced by an encode quality map as implemented by encode parameters 129.

Such quantized coefficients along with various control signals are entropy encoded via entropy encoder module 2014 to generate encoded bitstream 125, which may be transmitted or transferred or the like to a decoder. Furthermore, the quantized coefficients may be inverse quantized via inverse quantization module 2012 and inverse transformed via inverse transform module 2013 to generate reconstructed differences or residuals. The reconstructed differences or residuals may be combined with reference blocks via adder 2009 to generate reconstructed blocks, which, as shown may be provided to intra mode selection module 2003 and intra prediction module 2004 for use in intra prediction. Furthermore, the reconstructed differences or residuals may be deblocked via deblock filtering module 2006 and reconstructed via frame reconstruction module 2005 to generate reconstructed frames, which may be stored in a picture buffer (not shown) and provided to motion estimation module 2001 and motion compensation module 2002 for use in inter prediction. As discussed, the processing performance of encoder 2000 may be improved by the introduction of encode parameters 129.

Figure 21:
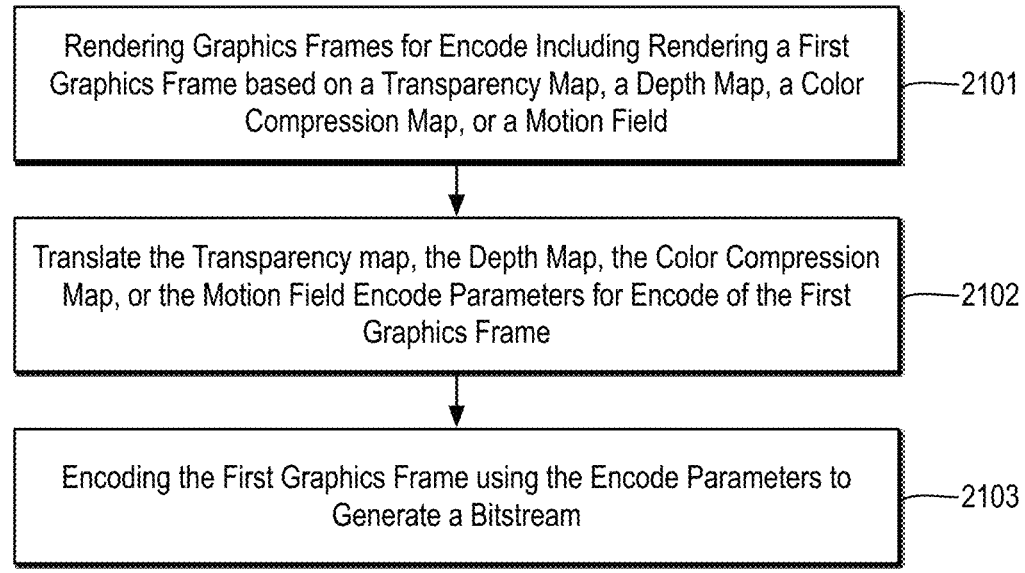
FIG. 21 is a flow diagram illustrating an example process for graphics frame rendering and encode.

FIG. 21 is a flow diagram illustrating an example process 2100 for graphics frame rendering and encode, arranged in accordance with at least some implementations of the present disclosure. Process 2100 may include one or more operations 2101-2103 as illustrated in FIG. 21. Process 2100 may form at least part of a video coding process. By way of non-limiting example, process 2100 may form at least part of a render and encode process as undertaken by system 100 as discussed herein. Furthermore, process 2100 will be described herein in reference to system 2200 of FIG. 22.

Figure 22:
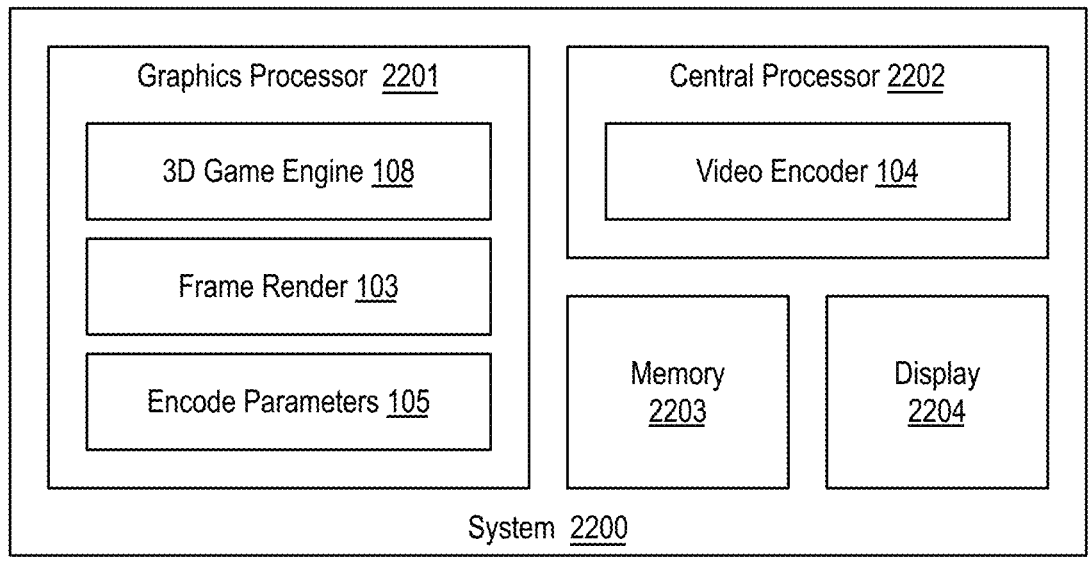
FIG. 22 is an illustrative diagram of an example system 2200 for graphics frame rendering and encode.

FIG. 22 is an illustrative diagram of an example system 2200 for graphics frame rendering and encode, arranged in accordance with at least some implementations of the present disclosure. As shown in FIG. 22, system 2200 may include a graphics processor 2201, a central processor 2202, and a memory 2203. System 2200 may also include a display 2204. Also as shown, graphics processor 2201 may include or implement 3D game engine 108, frame render module 103, and encode parameters module 105. Furthermore, central processor 2202 may include or implement video encoder 104. For example system 2200 may implement system 100. In the example of system 2200, memory 2203 may store video content such as graphics frames, encode parameter data, frame maps, or any other data or parameters discussed herein.

Graphics processor 2201 may include any number and type of graphics processors or processing units that may provide the operations as discussed herein. Such operations may be implemented via software or hardware or a combination thereof. In an embodiment, the illustrated modules of graphics processor 2201 may be implemented via circuitry or the like. For example, graphics processor 2201 may include circuitry dedicated to render frames, to manipulate video data to generate a compressed bitstream, and/or circuitry dedicated to manipulate a compressed bitstream to generate video data to provide the operations discussed herein. For example, graphics processor 2201 may include an electronic circuit to manipulate and alter memory to accelerate the creation of graphics frames in a frame buffer and/or to manipulate and alter memory to accelerate the creation of a bitstream based on images or frames of video.

Central processor 2202 may include any number and type of processing units or modules that may provide control and other high level functions for system 2200 and/or provide the operations discussed herein. For example, central processor 2202 may include an electronic circuit to perform the instructions of a computer program by performing basic arithmetic, logical, control, input/output operations, and the like specified by the instructions.

Memory 2203 may be any type of memory such as volatile memory (e.g., Static Random Access Memory (SRAM), Dynamic Random Access Memory (DRAM), etc.) or non-volatile memory (e.g., flash memory, etc.), and so forth. In an embodiment, memory 2203 may be configured to store graphics data such as pixel values, control parameters, bitstream data, or any other graphics data, frame data, or any other data discussed herein. In a non-limiting example, memory 2203 may be implemented by cache memory. In an embodiment, one or more or portions of 3D game engine 108, frame render module 103, and encode parameters module 105 may be implemented via execution units (EU) of graphics processor 2201. The execution units may include, for example, programmable logic or circuitry such as a logic core or cores that may provide a wide array of programmable logic functions. In an embodiment, 3D game engine 108, frame render module 103, and encode parameters module 105 may be implemented via dedicated hardware such as fixed function circuitry or the like. Fixed function circuitry may include dedicated logic or circuitry and may provide a set of fixed function entry points that may map to the dedicated logic for a fixed purpose or function.

In the illustrated embodiment, 3D game engine 108, frame render module 103, and encode parameters module 105 are implemented by graphics processor 2201. In other embodiments, one or some or components of 3D game engine 108, frame render module 103, and encode parameters module 105 are implemented by central processor 2202. Similarly, in the illustrated embodiment, video encoder 104 is implemented by central processor 2202. In other embodiments, video encoder 104 is implemented by graphics processor 1101. In some embodiments, video encoder 104 is implemented by a dedicated video processor.

Returning to discussion of FIG. 21, process 2100 may begin at operation 2101, where graphics frames are rendered for encode such that the rendering of a first graphics frame is based on one or more of a transparency map to blend two image layers into the first graphics frame, a depth map of the first graphics frame, a color compression map of the first graphics frame, or a motion field of the first graphics frame. The graphics frames may be rendered using any suitable technique or techniques. Notably, the rendering uses one or more of the transparency map, the depth map, the color compression map, or the motion field, which may be intercepted during the render process.

Processing may continue at operation 2102, where one or more of the transparency map, the depth map, the color compression map, or the motion field are translated to one or more encode parameters for encode of the first graphics frame. The transparency map, the depth map, the color compression map, or the motion field may be translated to one or more encode parameters using any suitable technique or techniques and the encode parameters may include any suitable data for influencing the encode such as an encode quality map, a motion estimation search map, a block partitioning policy map, or an intra mode policy map.

In an embodiment, the encode parameters include an encode quality map having an encode quality parameter for each of at least some blocks of the first graphics frame. In an embodiment, the two image layers include a game background image layer and a text overlay image layer such that the transparency map includes blend factors indicating a transparency of pixels of the text overlay image layer for the blend with higher blend factors reducing transparency, and the translating includes comparing a blend factor measurement for each of at least some blocks of the first graphics frame to a threshold and populating the encode quality map with a higher quality value for a block when the blend factor compares favorably to the threshold and a lower quality value for the block when the blend factor compares unfavorably to the threshold. In some embodiments, the color compression map includes color compression values with higher values indicating higher spatial color compression, and the translating includes combining the depth map and the negative of the color compression map to generate a resultant map for the first graphics frame and comparing a measurement from the resultant map for each of at least some blocks of the first graphics frame to a threshold and populating the encode quality map with a higher quality value for a block when the measurement compares unfavorably to the threshold and a lower quality value for the block when the measurement compares unfavorably to the threshold.

In an embodiment, the encode parameters comprise a motion estimation search map having a motion estimation search range or list of candidates for at least some blocks of the first graphics frame. In an embodiment, the translating includes determining a first depth value for a block of the first graphics frame, determining blocks of a second graphics frame, the second graphics frame being a motion estimation reference frame for the first graphics frame, having depth values within a threshold of the first depth value, and indicating the plurality of blocks as the motion estimation search list of candidates. In an embodiment, the translating includes determining a first depth value for a block of the first graphics frame, determining blocks of a second graphics frame, the second graphics frame being a motion estimation reference frame for the first graphics frame, having depth values within a threshold of the first depth value, determining a region of the second graphics frame including the blocks, and indicating the region as the motion estimation search range. In an embodiment, the translating includes determining a first depth value for a block of the first graphics frame, determining a temporal change in depth per frame for the block using corresponding blocks in graphics frames temporally prior to the first graphics frame, determining blocks of the second graphics frame, the second graphics frame being a motion estimation reference frame for the first graphics frame, having depth values within a threshold of the first depth value adjusted based on the temporal change in depth per frame, and indicating blocks as the motion estimation search list of candidates or a region of the second graphics frame comprising the plurality of blocks as the motion estimation search range.

In an embodiment, the encode parameters include a block partitioning policy map having a block partitioning policy for at least some blocks of the first graphics frame. In an embodiment, the translating includes determining, for blocks of the first graphics frame using the depth map, a static depth block measurement for each of the blocks, and comparing each static depth block measurement to a threshold and populating the block partitioning policy map with an indicator to skip evaluation of one or more smaller partitions of the block when the static depth block measurement compares favorably to a threshold or an indicator to skip evaluation of at least one large partition of the block when the static depth block measurement compares unfavorably to the threshold. In an embodiment, the translating includes determining, for a block of the first graphics frame using the motion field, a partition of the block having per pixel motion vectors within a threshold of one another and indicating the partition as a final partition for the block in the block partitioning policy.

In an embodiment, the encode parameters include an intra mode policy map having an intra mode candidates policy for at least some blocks of the first graphics frame and the translating includes determining, for a block of the first graphics frame using the depth map, an edge direction of an edge in the block, eliminating, based on the edge direction, one or more intra mode candidates having a direction opposing the edge direction, and indicating the eliminated intra mode candidates in the intra mode candidates policy.

Processing may continue at operation 2103, where the first graphics frame is encoded using the encode parameters to generate a bitstream. The first graphics frame may be encoded using any suitable technique or techniques such that the encode is modified using the encode parameters. The bitstream may be any suitable bitstream such as a standards (e.g., AVC, HEVC, VP8, VP9, AV1, etc.) compliant bitstream.

Various components of the systems described herein may be implemented in software, firmware, and/or hardware and/or any combination thereof. For example, various components of devices and systems discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement the techniques, modules, components, or the like as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 23:
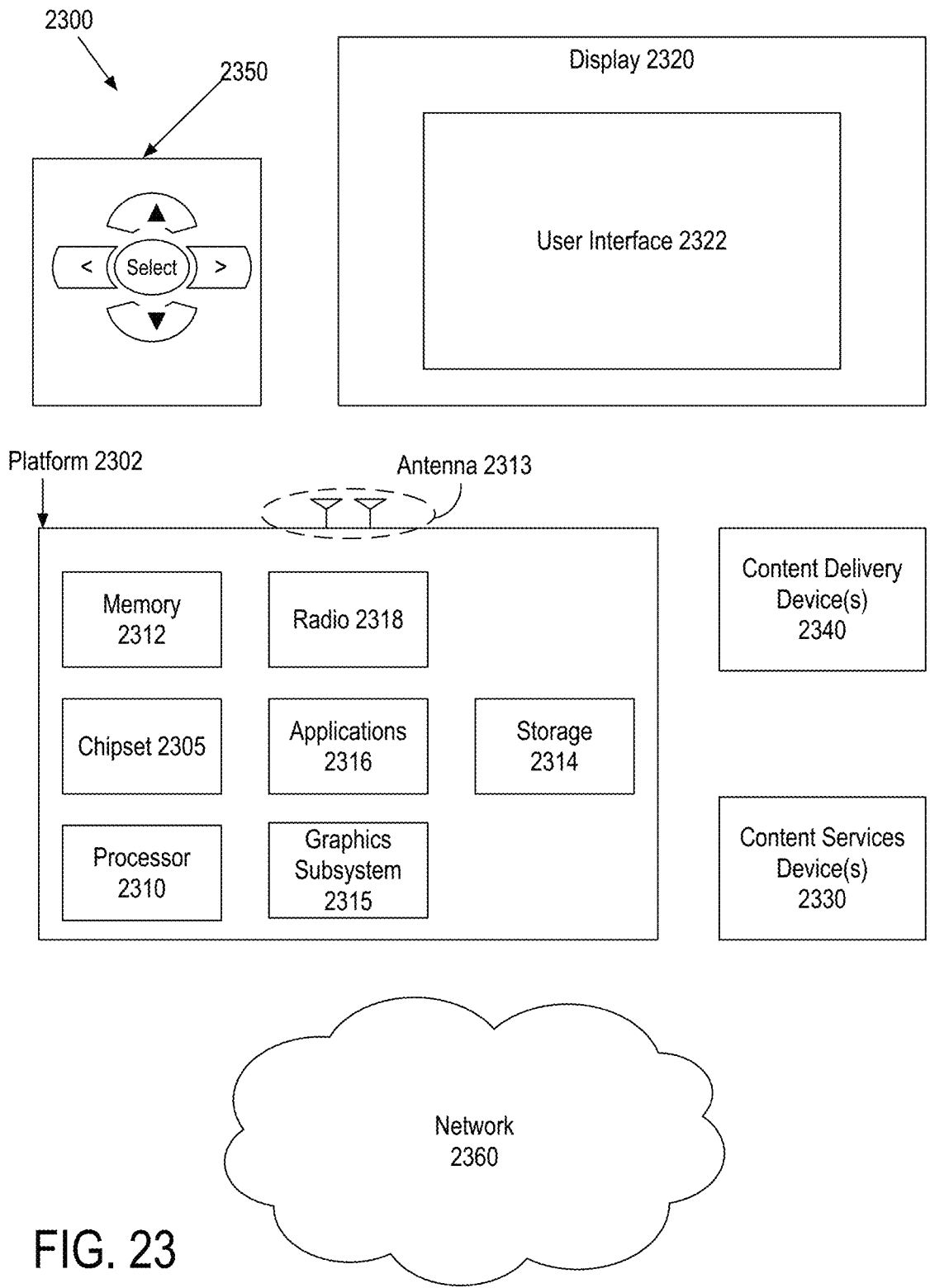
FIG. 23 is an illustrative diagram of an example system.

FIG. 23 is an illustrative diagram of an example system 2300, arranged in accordance with at least some implementations of the present disclosure. In various implementations, system 2300 may be a mobile system although system 2300 is not limited to this context. For example, system 2300 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), virtual reality device, augmented reality device, and so forth.

In various implementations, system 2300 includes a platform 2302 coupled to a display 2320. Platform 2302 may receive content from a content device such as content services device(s) 2330 or content delivery device(s) 2340 or other similar content sources. A navigation controller 2350 including one or more navigation features may be used to interact with, for example, platform 2302 and/or display 2320. Each of these components is described in greater detail below.

In various implementations, platform 2302 may include any combination of a chipset 2305, processor 2310, memory 2312, antenna 2313, storage 2314, graphics subsystem 2315, applications 2316 and/or radio 2318. Chipset 2305 may provide intercommunication among processor 2310, memory 2312, storage 2314, graphics subsystem 2315, applications 2316 and/or radio 2318. For example, chipset 2305 may include a storage adapter (not depicted) capable of providing intercommunication with storage 2314.

Processor 2310 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 2310 may be dual-core processor(s), dual-core mobile processor(s), and so forth.

Memory 2312 may be implemented as a volatile memory device such as, but not limited to, a Random Access Memory (RAM), Dynamic Random Access Memory (DRAM), or Static RAM (SRAM).

Storage 2314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 2314 may include technology to increase the storage performance enhanced protection for valuable digital media when multiple hard drives are included, for example.

Graphics subsystem 2315 may perform processing of images such as still or video for display. Graphics subsystem 2315 may be a graphics processing unit (GPU) or a visual processing unit (VPU), for example. An analog or digital interface may be used to communicatively couple graphics subsystem 2315 and display 2320. For example, the interface may be any of a High-Definition Multimedia Interface, DisplayPort, wireless HDMI, and/or wireless HD compliant techniques. Graphics subsystem 2315 may be integrated into processor 2310 or chipset 2305. In some implementations, graphics subsystem 2315 may be a stand-alone device communicatively coupled to chipset 2305.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 2318 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 2318 may operate in accordance with one or more applicable standards in any version.

In various implementations, display 2320 may include any television type monitor or display. Display 2320 may include, for example, a computer display screen, touch screen display, video monitor, television-like device, and/or a television. Display 2320 may be digital and/or analog. In various implementations, display 2320 may be a holographic display. Also, display 2320 may be a transparent surface that may receive a visual projection. Such projections may convey various forms of information, images, and/or objects. For example, such projections may be a visual overlay for a mobile augmented reality (MAR) application. Under the control of one or more software applications 2316, platform 2302 may display user interface 2322 on display 2320.

In various implementations, content services device(s) 2330 may be hosted by any national, international and/or independent service and thus accessible to platform 2302 via the Internet, for example. Content services device(s) 2330 may be coupled to platform 2302 and/or to display 2320. Platform 2302 and/or content services device(s) 2330 may be coupled to a network 2360 to communicate (e.g., send and/or receive) media information to and from network 2360. Content delivery device(s) 2340 also may be coupled to platform 2302 and/or to display 2320.

In various implementations, content services device(s) 2330 may include a cable television box, personal computer, network, telephone, Internet enabled devices or appliance capable of delivering digital information and/or content, and any other similar device capable of uni-directionally or bi-directionally communicating content between content providers and platform 2302 and/display 2320, via network 2360 or directly. It will be appreciated that the content may be communicated uni-directionally and/or bi-directionally to and from any one of the components in system 2300 and a content provider via network 2360. Examples of content may include any media information including, for example, video, music, medical and gaming information, and so forth.

Content services device(s) 2330 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 2302 may receive control signals from navigation controller 2350 having one or more navigation features. The navigation features of may be used to interact with user interface 2322, for example. In various embodiments, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of may be replicated on a display (e.g., display 2320) by movements of a pointer, cursor, focus ring, or other visual indicators displayed on the display. For example, under the control of software applications 2316, the navigation features located on navigation may be mapped to virtual navigation features displayed on user interface 2322, for example. In various embodiments, may not be a separate component but may be integrated into platform 2302 and/or display 2320. The present disclosure, however, is not limited to the elements or in the context shown or described herein.

In various implementations, drivers (not shown) may include technology to enable users to instantly turn on and off platform 2302 like a television with the touch of a button after initial boot-up, when enabled, for example. Program logic may allow platform 2302 to stream content to media adaptors or other content services device(s) 2330 or content delivery device(s) 2340 even when the platform is turned "off." In addition, chipset 2305 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 2300 may be integrated. For example, platform 2302 and content services device(s) 2330 may be integrated, or platform 2302 and content delivery device(s) 2340 may be integrated, or platform 2302, content services device(s) 2330, and content delivery device(s) 2340 may be integrated, for example. In various embodiments, platform 2302 and display 2320 may be an integrated unit. Display 2320 and content service device(s) 2330 may be integrated, or display 2320 and content delivery device(s) 2340 may be integrated, for example. These examples are not meant to limit the present disclosure.

In various embodiments, system 2300 may be implemented as a wireless system, a wired system, or a combination of both. When implemented as a wireless system, system 2300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 2300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 2302 may establish one or more logical or physical channels to communicate information. The information may include media information and control information. Media information may refer to any data representing content meant for a user. Examples of content may include, for example, data from a voice conversation, videoconference, streaming video, electronic mail ("email")

message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 23.

Figure 24:
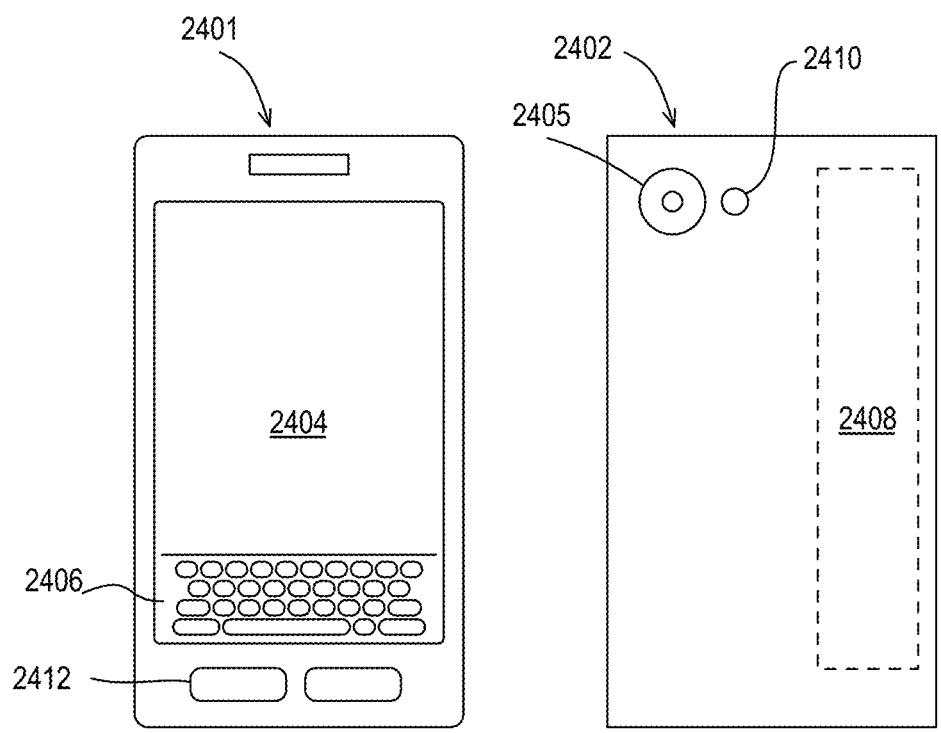
FIG. 24 illustrates an example small form factor device, all arranged in accordance with at least some implementations of the present disclosure.

As described above, system 2300 may be embodied in varying physical styles or form factors. FIG. 24 illustrates an example small form factor device 2400, arranged in accordance with at least some implementations of the present disclosure. In some examples, system 2300 may be implemented via device 2400. In other examples, system 1100 or portions thereof may be implemented via device 2400. In various embodiments, for example, device 2400 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 24, device 2400 may include a housing with a front 2401 and a back 2402. Device 2400 includes a display 2404, an input/output (I/O) device 2406, and an integrated antenna 2408. Device 2400 also may include navigation features 2412. I/O device 2406 may include any suitable I/O device for entering information into a mobile computing device. Examples for I/O device 2406 may include an alphanumeric keyboard, a numeric keypad, a touch pad, input keys, buttons, switches, microphones, speakers, voice recognition device and software, and so forth. Information also may be entered into device 2400 by way of microphone (not shown), or may be digitized by a voice recognition device. As shown, device 2400 may include a camera 2405 (e.g., including a lens, an aperture, and an imaging sensor) and a flash 2410 integrated into back 2402 (or elsewhere) of device 2400. In other examples, camera 2405 and flash 2410 may be integrated into front 2401 of device 2400 or both front and back cameras may be provided. Camera 2405 and flash 2410 may be components of a camera module to originate image data processed into streaming video that is output to display 2404 and/or communicated remotely from device 2400 via antenna 2408 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:
1. A system for coding rendered game content, comprising:
   memory to store a bitstream; and
   a processor coupled to the memory, the processor to:
      render a plurality graphics frames to encode, wherein the render of a first graphics frame of the plurality is based on one or more of a transparency map to blend two image layers into the first graphics frame, a depth map of the first graphics frame, a color compression map of the first graphics frame, or a motion field of the first graphics frame;

translate one or more of the transparency map, the depth map, the color compression map, or the motion field to one or more encode parameters to encode the first graphics frame, wherein the encode parameters comprise a block partitioning policy map comprising a block partitioning policy for each of a plurality of blocks of the first graphics frame, and wherein the processor to translate comprises the processor to determine, for the blocks of the first graphics frame using the depth map, a static depth block measurement for each of the blocks and to compare each static depth block measurement to a threshold and populate the block partitioning policy map with an indicator to skip evaluation of one or more smaller partitions of the block when the static depth block measurement compares favorably to a threshold or an indicator to skip evaluation of at least one large partition of the block when the static depth block measurement compares unfavorably to the threshold; and encode the first graphics frame using the encode parameters to generate the bitstream.

2. The system of claim 1, wherein the encode parameters comprise an encode quality map comprising encode quality parameters for the plurality of blocks of the first graphics frame.

3. The system of claim 2, wherein the two image layers comprise a game background image layer and a text overlay image layer, the transparency map comprises a plurality of blend factors indicating a transparency of pixels of the text overlay image layer for the blend with higher blend factors reducing transparency, and the processor to translate comprises the processor to:
compare a first blend factor measurement for a first block of the plurality of blocks of the first graphics frame to a threshold and populate the encode quality map with a higher quality value for the first block when the first blend factor compares favorably to the threshold or a lower quality value for the first block when the first blend factor compares unfavorably to the threshold.

4. The system of claim 2, wherein the color compression map comprises a plurality of color compression values with higher values indicating higher color compression, and the processor to translate comprises the processor to:
combine the depth map and a negative of the color compression map to generate a resultant map for the first graphics frame; and compare a first measurement from the resultant map for a first block of the plurality of blocks of the first graphics frame to a threshold and populate the encode quality map with a higher quality value for the first block when the first measurement compares unfavorably to the threshold or a lower quality value for the first block when the first measurement compares favorably to the threshold.

5. The system of claim 1, wherein the encode parameters comprise a motion estimation search map comprising motion estimation search ranges or lists of candidates for the plurality of blocks of the first graphics frame.

6. The system of claim 5, wherein the processor to translate comprises the processor to:
determine a first depth value for a first block of the plurality of blocks of the first graphics frame;

determine a plurality of second blocks of a second graphics frame, the second graphics frame comprising a motion estimation reference frame for the first graphics frame, having depth values within a threshold of the first depth value; and indicate the plurality of second blocks as the motion estimation search list of candidates or a region of the second graphics frame comprising the plurality of second blocks as the motion estimation search range.

7. The system of claim 5, wherein the processor to translate comprises the processor to:
determine a first depth value for a first block of the plurality of blocks of the first graphics frame;

determine a temporal change in depth per frame for the first block using a plurality of corresponding blocks in graphics frames temporally prior to the first graphics frame;

determine a plurality of second blocks of the second graphics frame, the second graphics frame comprising a motion estimation reference frame for the first graphics frame, having depth values within a threshold of the first depth value adjusted based on the temporal change in depth per frame; and indicate the plurality of second blocks as the motion estimation search list of candidates or a region of the second graphics frame comprising the plurality of second blocks as the motion estimation search range.

8. The system of claim 1, wherein the processor to translate comprises the processor to:
determine, for a first block of the first graphics frame using the motion field, a partition of the block having per pixel motion vectors within a threshold of one another; and indicate the partition as a final partition for the block in the block partitioning policy.

9. The system of claim 1, wherein the encode parameters comprise an intra mode policy map comprising intra mode candidates policies for the plurality of blocks of the first graphics frame, and the processor to translate comprises the processor to:
determine, for a first block of the plurality of blocks of the first graphics frame using the depth map, an edge direction of an edge in the first block;

eliminate, based on the edge direction, one or more intra mode candidates having a direction opposing the edge direction; and indicate the eliminated intra mode candidates in the intra mode candidates policy.

10. A computer-implemented method for coding rendered game content, comprising:
rendering a plurality graphics frames to encode,
wherein the rendering of a first graphics frame of the plurality is based on one or more of a transparency map to blend two image layers into the first graphics frame, a depth map of the first graphics frame, a color compression map of the first graphics frame, or a motion field of the first graphics frame, translating one or more of the transparency map, the depth map, the color compression map, or the motion field to one or more encode parameters to encode the first graphics frame, wherein the encode parameters comprise a block partitioning policy map comprising a block partitioning policy for each of a plurality of blocks of the first graphics frame, and wherein said translating comprises determining, for the blocks of the first graphics frame using the depth map, a static depth block measurement for each of the blocks and comparing each static depth block measurement to a threshold and populating the block partitioning policy map with an indicator to skip evaluation of one or more smaller partitions of the block when the static depth block measurement compares favorably to a threshold or an indicator to skip evaluation of at least one large partition of the block when the static depth block measurement compares unfavorably to the threshold; and encoding the first graphics frame using the encode parameters to generate a bitstream.

11. The method of claim 10, wherein the encode parameters comprise an encode quality map comprising encode quality parameters for the plurality of blocks of the first graphics frame, the two image layers comprise a game background image layer and a text overlay image layer, the transparency map comprises a plurality of blend factors indicating a transparency of pixels of the text overlay image layer for the blend with higher blend factors reducing transparency, and said translating comprises:

comparing a first blend factor measurement for a first block of the plurality of blocks of the first graphics frame to a threshold and populating the encode quality map with a higher quality value for the first block when the first blend factor compares favorably to the threshold or a lower quality value for the first block when the first blend factor compares unfavorably to the threshold.

12. The method of claim 10, wherein the encode parameters comprise a motion estimation search map comprising motion estimation search ranges or lists of candidates for the plurality of blocks of the first graphics frame, and said translating comprises:

determining a first depth value for a first block of the plurality of blocks of the first graphics frame;

determining a plurality of second blocks of a second graphics frame, the second graphics frame comprising a motion estimation reference frame for the first graphics frame, having depth values within a threshold of the first depth value; and indicating the plurality of second blocks as the motion estimation search list of candidates or the region as the motion estimation search range.

13. The method of claim 10, wherein the encode parameters comprise an intra mode policy map comprising intra mode candidates policies for the plurality of blocks of the first graphics frame, and said translating comprises:

determining, for a first block of the plurality of blocks of the first graphics frame using the depth map, an edge direction of an edge in the first block;

eliminating, based on the edge direction, one or more intra mode candidates having a direction opposing the edge direction; and indicating the eliminated intra mode candidates in the intra mode candidates policy.

14. At least one non-transitory machine readable medium comprising a plurality of instructions that, in response to being executed on a computing device, cause the computing device to code rendered game content by:

rendering a plurality graphics frames to encode, wherein the rendering of a first graphics frame of the plurality is based on one or more of a transparency map to blend two image layers into the first graphics frame, a depth map of the first graphics frame, a color compression map of the first graphics frame, or a motion field of the first graphics frame;

translating one or more of the transparency map, the depth map, the color compression map, or the motion field to one or more encode parameters to encode the first graphics frame, wherein the encode parameters comprise a block partitioning policy map comprising a block partitioning policy for each of a plurality of blocks of the first graphics frame, and wherein said translating comprises determining, for the blocks of the first graphics frame using the depth map, a static block measurement for each of the blocks and comparing each static depth block measurement to a threshold and populating the block partitioning policy map with an indicator to skip evaluation of one or more smaller partitions of the block when the static depth block measurement compares favorably to a threshold or an indicator to skip evaluation of at least one large partition of the block when the static depth block measurement compares unfavorably to the threshold; and encoding the first graphics frame using the encode parameters to generate a bitstream.

15. The non-transitory machine readable medium of claim 14, wherein the encode parameters comprise an encode quality map comprising encode quality parameters for the plurality of blocks of the first graphics frame, the two image layers comprise a game background image layer and a text overlay image layer, the transparency map comprises a plurality of blend factors indicating a transparency of pixels of the text overlay image layer for the blend with higher blend factors reducing transparency, and said translating comprises:

comparing a first blend factor measurement for a first block of the plurality of blocks of the first graphics frame to a threshold and populating the encode quality map for a higher quality value for the first block when the first blend factor compares favorably to the threshold or a lower quality value for the first block when the first blend factor compares unfavorably to the threshold.

16. The non-transitory machine readable medium of claim 14, wherein the encode parameters comprise a motion estimation search map comprising motion estimation search ranges or lists of candidates for the plurality of blocks of the first graphics frame, and said translating comprises:

determining a first depth value for a first block of the plurality of blocks of the first graphics frame;

determining a plurality of second blocks of a second graphics frame, the second graphics frame comprising a motion estimation reference frame for the first graphics frame, having depth values within a threshold of the first depth value; and indicating the plurality of second blocks as the motion estimation search list of candidates or the region as the motion estimation search range.

17. The non-transitory machine readable medium of claim 14, wherein the encode parameters comprise an intra mode policy map comprising intra mode candidates policies for the plurality of blocks of the first graphics frame, and said translating comprises:
   determining, for a first block of the plurality of blocks of the first graphics frame using the depth map, an edge direction of an edge in the first block;
   eliminating, based on the edge direction, one or more intra mode candidates having a direction opposing the edge direction; and
   indicating the eliminated intra mode candidates in the intra mode candidates policy.

* * * * *